(12) United States Patent
Wang et al.

(10) Patent No.: US 12,108,208 B2
(45) Date of Patent: Oct. 1, 2024

(54) ACOUSTIC OUTPUT DEVICES

(71) Applicant: SHENZHEN SHOKZ CO., LTD., Guangdong (CN)

(72) Inventors: Liwei Wang, Shenzhen (CN); Lei Zhang, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 159 days.

(21) Appl. No.: 17/932,288

(22) Filed: Sep. 14, 2022

(65) Prior Publication Data

US 2023/0009102 A1 Jan. 12, 2023

Related U.S. Application Data

(63) Continuation of application No. PCT/CN2020/140815, filed on Dec. 29, 2020.

(30) Foreign Application Priority Data

Aug. 4, 2020 (WO) ................ PCT/CN2020/106759

(51) Int. Cl.
*H03G 5/00* (2006.01)
*H04R 1/02* (2006.01)
(Continued)

(52) U.S. Cl.
CPC ............... *H04R 1/40* (2013.01); *H04R 1/023* (2013.01); *H04R 1/1008* (2013.01);
(Continued)

(58) Field of Classification Search
CPC .......... H04R 1/40; H04R 1/023; H04R 1/008; H04R 1/1075; H04R 1/1091
See application file for complete search history.

(56) References Cited

U.S. PATENT DOCUMENTS 5,740,265 A 4/1998 Shirakawa
2001/0012372 A1* 8/2001 Yamagishi ........... H04R 1/2857
381/349

(Continued)

FOREIGN PATENT DOCUMENTS

CN 201616895 U 10/2010
CN 103108268 A 5/2013
(Continued)

OTHER PUBLICATIONS

International Search Report in PCT/CN2020/106759 mailed on Oct. 28, 2020, 6 pages.
(Continued)

*Primary Examiner* — Simon King
(74) *Attorney, Agent, or Firm* — METIS IP LLC

(57) ABSTRACT

This present disclosure discloses an acoustic output device comprising: an acoustic driver that includes a diaphragm and a magnetic circuit structure, wherein a side of the diaphragm facing away from the magnetic circuit structure forms a front side of the acoustic driver, a side of the magnetic circuit structure facing away from the diaphragm forms a back side of the acoustic driver, the diaphragm vibrates so that the acoustic driver radiates sound outward from its front and back, respectively; a housing structure configured to carry the acoustic driver, wherein the back side of the acoustic driver and the housing structure form a back cavity, and different side walls of the back cavity are connected by a curved structure; the housing structure includes at least one sound outlet hole, the at least one sound outlet hole is acoustically coupled with the back cavity.

18 Claims, 21 Drawing Sheets

(51) Int. Cl.
  *H04R 1/10* (2006.01)
  *H04R 1/22* (2006.01)
  *H04R 1/24* (2006.01)
  *H04R 1/28* (2006.01)
  *H04R 1/34* (2006.01)
  *H04R 1/40* (2006.01)
  *H04R 7/04* (2006.01)
  *H04R 7/18* (2006.01)
  *H04R 9/02* (2006.01)
  *H04R 9/06* (2006.01)

(52) U.S. Cl.
  CPC ......... *H04R 1/1075* (2013.01); *H04R 1/1091* (2013.01); *H04R 1/227* (2013.01); *H04R 1/24* (2013.01); *H04R 1/2846* (2013.01); *H04R 1/2884* (2013.01); *H04R 1/345* (2013.01); *H04R 7/04* (2013.01); *H04R 7/18* (2013.01); *H04R 9/025* (2013.01); *H04R 9/06* (2013.01)

(56) References Cited

U.S. PATENT DOCUMENTS

| | | | |
|---|---|---|---|
| 2008/0013774 A1 | 1/2008 | Hosaka et al. | |
| 2010/0135516 A1* | 6/2010 | Saiki | H04R 1/2811 340/602 |
| 2014/0226847 A1 | 8/2014 | Yang | |
| 2015/0163583 A1 | 6/2015 | Howes et al. | |
| 2016/0119718 A1* | 4/2016 | Yang | H04R 1/24 381/351 |
| 2016/0241938 A1* | 8/2016 | Huang | H04R 1/023 |
| 2017/0208395 A1 | 7/2017 | Wan et al. | |
| 2017/0289658 A1* | 10/2017 | Mu | H04R 1/025 |
| 2018/0027322 A1* | 1/2018 | Shi | H04R 1/288 381/353 |
| 2018/0027333 A1* | 1/2018 | Mao | H04R 7/127 381/398 |
| 2018/0035198 A1* | 2/2018 | Zhong | H04R 9/025 |
| 2018/0091878 A1 | 3/2018 | Della Rosa et al. | |
| 2018/0192202 A1* | 7/2018 | Wang | H04R 7/16 |
| 2018/0249243 A1* | 8/2018 | Honda | H04R 1/26 |
| 2018/0302724 A1* | 10/2018 | Li | H04R 1/06 |
| 2019/0075384 A1 | 3/2019 | Miwa | |
| 2019/0158953 A1* | 5/2019 | Shang | H04R 1/2857 |
| 2020/0336810 A1* | 10/2020 | Miao | H04R 9/025 |
| 2021/0067852 A1* | 3/2021 | Li | H04R 31/00 |
| 2021/0281944 A1 | 9/2021 | Nageno et al. | |
| 2021/0281954 A1* | 9/2021 | Qi | H04R 9/02 |

FOREIGN PATENT DOCUMENTS

| | | |
|---|---|---|
| CN | 103209377 A | 7/2013 |
| CN | 103260117 A | 8/2013 |
| CN | 203301726 U | 11/2013 |
| CN | 203523010 U | 4/2014 |
| CN | 207070324 U | 3/2018 |
| CN | 108718430 A | 10/2018 |
| CN | 208806980 U | 4/2019 |
| CN | 209572154 U | 11/2019 |
| CN | 110554520 A | 12/2019 |
| CN | 110933548 A | 3/2020 |
| EP | 0448110 A2 | 9/1991 |
| EP | 1874079 A2 | 1/2008 |
| JP | S52156526 U | 11/1977 |
| JP | S619988 U | 1/1986 |
| JP | 2000023280 A | 1/2000 |
| JP | 2000041292 A | 2/2000 |
| JP | 2001016673 A | 1/2001 |
| JP | 2004320207 A | 11/2004 |
| JP | 2005311986 A | 11/2005 |
| JP | 2009027568 A | 2/2009 |
| JP | 2014236283 A | 12/2014 |
| JP | 2015103825 A | 6/2015 |
| JP | 2017112531 A | 6/2017 |
| JP | 2019121898 A | 7/2019 |

OTHER PUBLICATIONS

Written Opinion in PCT/CN2020/106759 mailed on Oct. 28, 2020, 6 pages.
International Search Report in PCT/CN2020/140815 mailed on Apr. 29, 2021, 6 pages.
Office Action in Russian Application No. 2022124776 mailed on Apr. 20, 2023, 20 pages.
The Extended European Search Report in European Application No. 20948847.7 mailed on Aug. 2, 2023, 8 pages.
Notice of Reasons for Rejection in Japanese Application No. 2022-563185 mailed on Nov. 27, 2023, 7 pages.
Search Report by Registered Search Organization in Japanese Application No. 2022-563185 mailed on Oct. 19, 2023, 21 pages.
Notice of Reasons for Rejection in Japanese Application No. 2022-563185 mailed on Jun. 3, 2024, 7 pages.

* cited by examiner

ACOUSTIC OUTPUT DEVICES

CROSS-REFERENCE TO RELATED APPLICATIONS

This application is a Continuation of International Application No. PCT/CN2020/140815, filed on Dec. 29, 2020 which claims priority to Chinese Patent Application No. PCT/CN2020/106759, filed on Aug. 4, 2020, the entire contents of each of which are incorporated herein by reference.

TECHNICAL FIELD

The present disclosure relates to the field of acoustics, and in particular, to an acoustic output device.

BACKGROUND

An open-ear acoustic output device is a portable audio output device that realizes sound conduction within a specific range. Compared with traditional in-ear and over-ear earphones, the open-ear acoustic output device does not block or cover the ear canals, which allows a user to obtain sound information from the external environment while listening to music, and improves safety and comfort. Due to the use of the open structure, the sound leakage of the open-ear acoustic output device is often more serious than that of traditional earphones. At present, the common practice in the industry is to place a speaker in an acoustic cavity, and the front and the back of the acoustic cavity are respectively opened to generate a specific sound field with a certain directivity. In some cases, considering some appearance design and structural problems of the acoustic output device, the back of the acoustic cavity cannot be opened. At this time, due to the reflection of the sound inside the acoustic cavity, resonance and standing waves will be caused, so that the sound output from the back of the acoustic cavity will have a lower high-frequency resonance peak. In such cases, the frequency response range of the acoustic output device is narrowed. On the other hand, in the vicinity of the high-frequency resonance peak, the phase of the sound output from the back of the acoustic cavity may be reversed, resulting in the superposition of the sound output from the back of the acoustic cavity and the sound output from the front, which will cause greater far-field sound leakage.

Therefore, it is desirable to provide an acoustic output device that can effectively suppress standing waves and widen the frequency response range of the acoustic output device.

SUMMARY

The present disclosure provides an acoustic output device. The acoustic output device may comprise: an acoustic driver, wherein the acoustic driver includes a diaphragm and a magnetic circuit structure, a side of the diaphragm facing away from the magnetic circuit structure forms a front side of the acoustic driver, a side of the magnetic circuit structure facing away from the diaphragm forms a back side of the acoustic driver, the diaphragm vibrates so that the acoustic driver radiates sounds outward from its front side and back side, respectively; and a housing structure, which is configured to carry the acoustic driver, wherein the back side of the acoustic driver and the housing structure form a back cavity, and different side walls of the back cavity are connected to each other by a curved structure; the housing structure includes at least one sound outlet hole, the at least one sound outlet hole is acoustically coupled with the back cavity, and outputs the sound radiated to the back cavity by the acoustic driver to the outside of the acoustic output device, wherein the at least one sound outlet hole is located on at least part of the side walls of the back cavity.

In some embodiments, the side walls of the back cavity comprise at least one first side wall and a second side wall; the at least one first side wall is located on a peripheral side of the housing structure, the second side wall is disposed opposite to the back side of the acoustic driver, and one end of the at least one first side wall away from the acoustic driver is connected to an end of the second side wall through the curved structure.

In some embodiments, the at least one sound outlet hole is located on the at least one first side wall.

In some embodiments, the at least one sound outlet hole comprises a first sound outlet hole and a second sound outlet hole, the first sound outlet hole and the second sound outlet hole are located on the at least one first side wall, and the first sound outlet hole and the second sound outlet hole are disposed opposite to each other.

In some embodiments, a cross-sectional area of the second sound outlet hole is not greater than a cross-sectional area of the first sound outlet hole.

In some embodiments, the cross-sectional area of the at least one sound outlet hole is not less than 0.25 $mm^2$.

In some embodiments, an acoustic damping structure is disposed at the at least one sound outlet hole.

In some embodiments, the magnetic circuit structure comprises a magnetic conductive plate disposed opposite to the diaphragm, the magnetic conductive plate includes at least one third sound outlet hole, and the at least one third sound outlet hole guides a sound generated by vibration of the diaphragm from the back side of the acoustic driver.

In some embodiments, a sound guide tube is disposed at the at least one third sound outlet hole along a direction away from the diaphragm, the sound guide tube guides the sound radiated from the at least one third sound outlet hole into the back cavity.

In some embodiments, the at least one third sound outlet hole comprises a first hole portion and a second hole portion sequentially disposed from inside to outside, the first hole portion and the second hole portion pass through, and a diameter of the second hole portion is larger than a diameter of the first hole portion.

In some embodiments, a shape of the diaphragm is a plane or approximately a plane.

In some embodiments, the diaphragm is fixed on the acoustic driver by a ring, and the ring is sunken in a direction away from the back cavity.

In some embodiments, the front side of the acoustic driver is further disposed with a protective structure, and the protective structure is disposed opposite to the diaphragm.

In some embodiments, the protective structure is configured to separate the diaphragm from the outside and transmit the sound emitted by the diaphragm to the outside.

In some embodiments, the protective structure comprises a filter structure.

In some embodiments, the protective structure comprises a plate body structure with at least one sound outlet hole.

In some embodiments, the front side of the acoustic driver and the housing structure form a front cavity, the housing structure includes at least one fourth sound guide hole, and the fourth sound guide hole guides the sound generated by the diaphragm from the front side of the acoustic driver to the outside of the acoustic output device.

In some embodiments, an acoustic damping structure is provided at the at least one fourth sound outlet hole.

BRIEF DESCRIPTION OF THE DRAWINGS

The present disclosure is further illustrated in terms of exemplary embodiments. These exemplary embodiments are described in detail with reference to the drawings. These examples are not limiting, and in these examples, the same numbers refer to the same structures, wherein.

DETAILED DESCRIPTION

Figure 1:
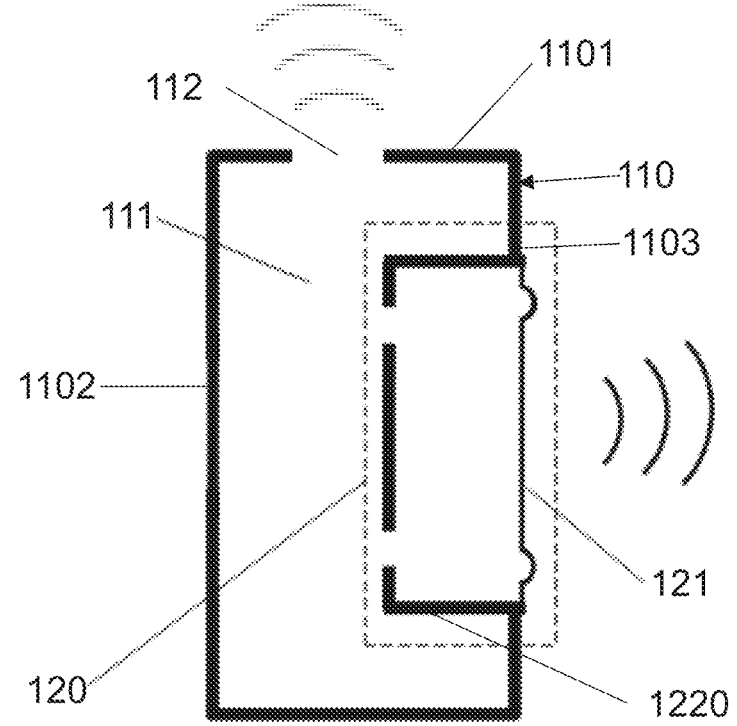
FIG. 1 is an exemplary structural schematic diagram illustrating an acoustic output device according to some embodiments of the present disclosure.

In order to illustrate the technical solutions of the embodiments of the present disclosure more clearly, the following briefly introduces the accompanying drawings that are used in the description of the embodiments. Obviously, the drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and are not intended to limit the scope of the present disclosure. Unless obviously obtained from the context or the context illustrates otherwise, the same numeral in the drawings refers to the same structure or operation.

It will be understood that the terms "system," "device," "unit," and/or "module" used herein are one method to distinguish different components, elements, parts, sections, or assemblies of different levels. However, the terms may be displaced by another expression if they achieve the same purpose.

As used in the disclosure and the appended claims, the singular forms "a," "an," and "the" include plural referents unless the content clearly dictates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

The flowcharts used in the present disclosure illustrate operations that systems implement according to some embodiments of the present disclosure. It is to be expressly understood the operations of the flowcharts may be implemented not in order. Conversely, the operations may be implemented in an inverted order, or simultaneously. Moreover, one or more other operations may be added to the flowcharts. One or more operations may be removed from the flowcharts.

This present disclosure describes an acoustic output device with a curved structure in a cavity. For example, the acoustic output device may include at least an acoustic driver and a housing structure. The front side of the acoustic driver may radiate sound directly to the outside. The back side of the acoustic driver and the housing structure may form a back cavity. The side wall on the peripheral side of the back cavity may include a first sound outlet hole, the first sound outlet hole may be acoustically coupled with the back cavity, and the sound on the back side of the acoustic driver may be radiated to the outside from the first sound outlet hole. Since the position of the first sound outlet hole is not disposed on the side wall of the bottom of the back cavity that is opposite to the back side of the acoustic driver, the housing structure of the back cavity will reflect the sound generated on the back side of the acoustic driver in the process of sound output, causing resonance and standing waves. This causes a large difference between the sound output from the back side of the acoustic driver and the sound output from the front side of the acoustic driver, which is not conducive to interference cancellation and reduces sound leakage. By disposing curved structure(s) between different side walls of the back cavity (for example, the side wall on the peripheral side of the back cavity and the side wall at the bottom of the back cavity are connected by a curved structure), the reflection conditions inside the back cavity can be destroyed, standing waves can be suppressed. At the same time, the volume of the back cavity can be further compressed through the curved structure(s), thereby widening the frequency spectrum of the sound generated by the back cavity. Therefore, by disposing curved structure(s) between different side walls of the back cavity, it can ensure that in a wide frequency range, the sound from the back side of the acoustic driver (the first sound outlet hole) and the sound radiated from the front side of the acoustic driver (diaphragm) form dual sound sources that meet certain conditions (e.g., have opposite phases and the same amplitude), thereby, the sound leakage volume of the acoustic output device in the far field is effectively reduced.

FIG. 1 is an exemplary structural schematic diagram illustrating an acoustic output device according to some embodiments of the present disclosure. As shown in FIG. 1, an acoustic output device 100 may include a housing structure 110 that is hollow inside and an acoustic driver 120 disposed in the housing structure 110. The acoustic driver 120 may include a diaphragm 121 and a magnetic circuit structure 1220. The acoustic driver 120 may also include a voice coil (not shown). The voice coil may be fixed on a side of the diaphragm 121 facing the magnetic circuit structure 1220 and located in the magnetic field formed by the magnetic circuit structure 1220. When the voice coil is energized, it may vibrate under the action of the magnetic field and drive the diaphragm 121 to vibrate, thereby generating sound. For the convenience of description, the side of the diaphragm 121 facing away from the magnetic circuit structure 1220 (i.e., the right side of the diaphragm 121 in FIG. 1) may be regarded as the front side of the acoustic driver 120, the side of the magnetic circuit structure 1220 facing away from the diaphragm 121 (i.e., the left side of the magnetic circuit structure 1220 in FIG. 1) may be regarded as the back side of the acoustic driver 120. The vibration of the diaphragm 121 may cause the acoustic driver 120 to radiate sounds outward from its front and back, respectively. As shown in FIG. 1, the back side of the acoustic driver 120 and the housing structure 110 form a back cavity 111. The back side of the acoustic driver 120 may radiate sound toward the back cavity 111.

As shown in FIG. 1, the side wall of the back cavity 111 may include a first side wall 1101, a second side wall 1102, and a third side wall 1103. The second side wall 1102 and the third side wall 1103 are opposite to each other. The first side wall 1101 may refer to the side wall surrounding an axis, wherein the axis is a line extending from the front center of the acoustic driver 120 to the back center of the acoustic driver 120. The first side wall 1101 may also be referred to as the peripheral side wall of the back cavity 111. In some embodiments, the count of the first side wall 1101 may be one or more. For example, when the housing structure 110 is a cylinder, the first side wall 1101 may be an annular circumferential side wall of the cylinder. As another example, when the housing structure 110 is a cuboid, the first side wall 1101 may include four mutually connected peripheral side walls of the cuboid. The second side wall 1102 may refer to the side wall on the left side of the plan view shown in FIG. 1, which is disposed opposite to the back side of the acoustic driver 120. The second side wall 1102 may also be referred to as the bottom side wall of the back cavity 111. The third side wall 1103 may refer to the side wall on the right side of the plan view shown in FIG. 1. In some embodiments, the diaphragm 121 may be directly located at the third side wall 1103. For example, the third side wall 1103 includes a mounting hole, and the diaphragm 121 may be located in the mounting hole. In some embodiments, the diaphragm 121 may not be located at the third side wall 1103. For example, the third side wall 1103 is disposed with a convex or concave extension portion, and the extension portion has space for supporting the diaphragm 121, and the diaphragm 121 is connected to the extension portion. In some alternative embodiments, the side walls of the back cavity 111 may include only the first side wall 1101 and the second side wall 1102.

In some embodiments, the housing structure 110 may further include a first sound outlet hole 112, and the first sound outlet hole 112 may be located on the first side wall 1101 and communicated with the back cavity 111. The sound generated at the back side of the acoustic driver 120 may be transmitted to the outside through the first sound outlet hole 112. Within a specific frequency range, the sound output from the first sound outlet hole 112 and the sound output from the diaphragm 121 may form dual sound sources that meet specific conditions (for example, have opposite phases and the same amplitude). In the far field, the sound output from the first sound outlet hole 112 may cancel the sound output from the diaphragm 121, further, the sound leakage volume of the acoustic output device in the far field is reduced, so as to prevent other users from hearing the sound emitted by the acoustic output device. In some embodiments, the first sound outlet hole 112 may be located on the second side wall 1102 and communicate with the back cavity 111.

Figure 2:
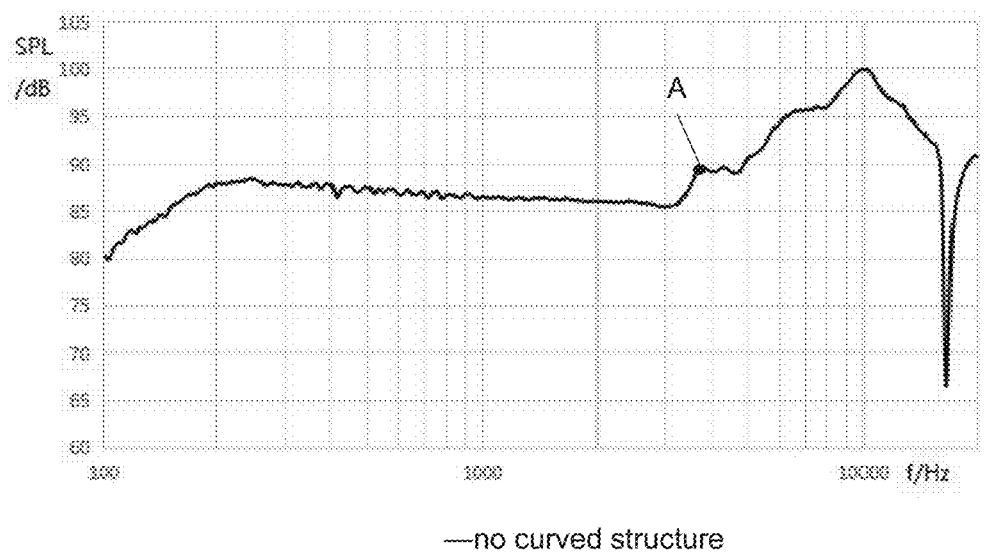
FIG. 2 is a schematic diagram illustrating a frequency response curve of an acoustic output device according to some embodiments of the present disclosure.

When the first sound outlet hole 112 is disposed on the first side wall of the housing structure 110, the sound from the back side of the acoustic driver 120 may pass through the back cavity 111. In the process of outputting sound from the first sound outlet hole 112, the reflection of the sound on the back side of the acoustic driver 120 by the back cavity 111 will cause resonance and standing waves of the sound. The frequency of the standing waves formed in the back cavity 111 will generate a larger sound intensity, which corresponds to the resonance peak on the frequency response curve of the back cavity 111. According to the standing waves formula:

$$f_1 = \frac{c_0}{4l}(2n-1), \tag{1}$$

wherein n is a positive integer, $c_0$ represents the speed of sound in air, l represents the length of the long side of the back cavity (i.e., the dimension of the second side wall 1102 in the vertical direction in FIG. 1), and $f_1$ represents the frequency of the standing waves. When l=0.023 m, $f_1$=3.7 kHz. For the purpose of illustration, FIG. 2 shows the actual frequency response of the back cavity 111 when the first sound outlet hole 112 is disposed on the first side wall. As shown in FIG. 2, when the first sound outlet hole 112 is located on the first side wall 1101 of the housing structure 110 (when there is no curved structure as shown in FIG. 2), a high-frequency resonance peak is located at point A, and the corresponding frequency is about 3.7 kHz, which is basically consistent with the result calculated by formula (1).

In the embodiments of the present disclosure, in order to further widen the frequency range of the back cavity so that the sound derived from the first sound outlet hole 112 can interfere with the sound generated at the front side of the acoustic driver in a larger frequency range, curved structure(s) may be disposed between different side walls of the back cavity, so as to destroy the reflection of sound by the internal structure of the back cavity and suppress the formation of standing waves. In addition, the curved structure(s) may compress the volume of the back cavity and move the resonance peak of the back cavity to a higher frequency region, thereby further broadening the frequency range of the back cavity.

The acoustic output device provided by the embodiments of the present disclosure will be described in detail below with reference to the accompanying drawings.

Figure 3:
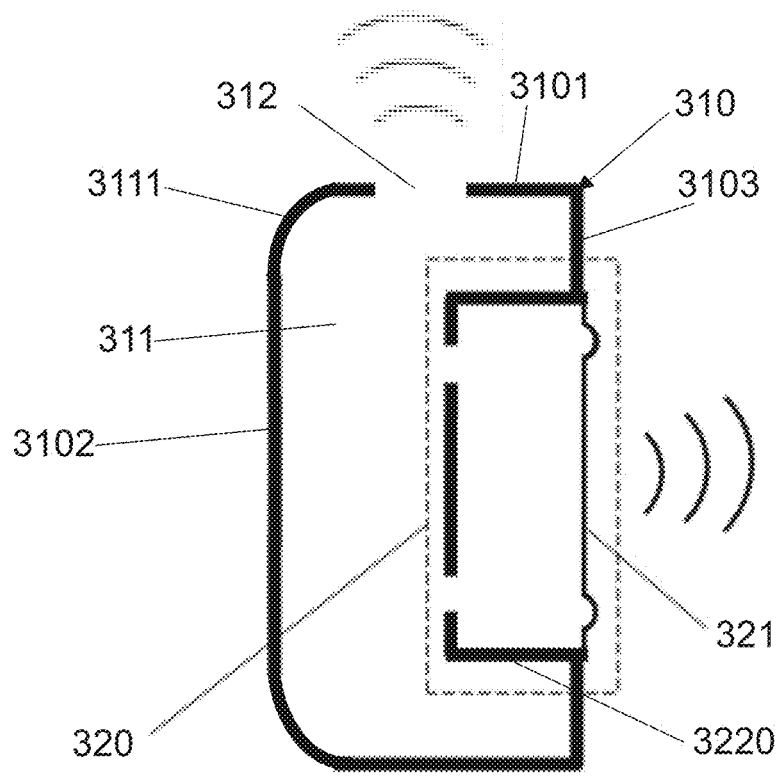
FIG. 3 is an exemplary structural schematic diagram illustrating an acoustic output device according to some embodiments of the present disclosure.

FIG. 3 is an exemplary structural schematic diagram illustrating an acoustic output device according to some embodiments of the present disclosure.

As shown in FIG. 3, an acoustic output device 300 may include a housing structure 310 and an acoustic driver 320 connected to the housing structure 310.

In some embodiments, the housing structure 310 may be used to carry one or more acoustic drivers 320. In some embodiments, the housing structure 310 may be an enclosed housing structure with a hollow interior, and the acoustic driver 320 may be fixedly connected to the housing structure 310.

In some embodiments, the acoustic output device 300 may be worn on the user's body (e.g., the human head, neck, or upper torso) through the housing structure 310. At the same time, the housing structure 310 and the acoustic driver 320 may be close to but not block the ear canals, so that the user's ears remain open, and the user can not only hear the sound output by the acoustic output device 300, but also hear the sound of the external environment. For example, the acoustic output device 300 may be disposed around or partially around the circumference of the user's ear. In some embodiments, the acoustic output device 300 may be combined with products such as glasses, a headset, a head-mounted display device, an AR/VR helmet, etc. In such cases, the housing structure 310 may be fixed in the vicinity of the user's ears by means of hanging or clamping. In some alternative embodiments, the housing structure 310 may be provided with a hook, and the shape of the hook matches the shape of the auricle, so that the acoustic output device 300 may be independently worn on the user's ear through the hook. The independently worn acoustic output device 300 may be connected to a signal source (e.g., a computer, a mobile phone or other mobile devices) through a wired or wireless (e.g., Bluetooth) manner. For example, the acoustic output devices 300 at the left and right ears may both be connected in direct communication with the signal source in a wireless manner. As another example, the acoustic output devices 300 at the left and right ears may include a first output device and a second output device, wherein the first output device may be communicatively connected to the signal source, the second output device may be wirelessly connected to the first output device in a wireless manner, audio playback is synchronized between the first output device and the second output device through one or more synchronization signals. The manner of wireless connection may include but be not limited to Bluetooth, local area network, wide area network, wireless personal area network, near field communication, etc., or any combination thereof.

In some embodiments, the housing structure 310 may be a housing structure having a shape adapted to a human ear, such as a circular ring, an oval, a polygon (regular or irregular), a U-shape, a V-shape, a semicircle, so that the housing structure 310 may be directly attached to the user's ear. In some embodiments, the housing structure 310 may include one or more fixing structures. The fixing structures may include an ear hook, a head hanger, or an elastic band, so that the acoustic output device 300 can be better fixed on the user's body and prevent the acoustic output device 300 from falling during use. For example, the elastic band may be a headband that may be worn around the head area. As another example, the elastic band may be a neckband to be worn around the neck/shoulder area. In some embodiments, the elastic band may be a continuous band and elastically stretched to fit over the user's head, at the same time, the elastic band may also exert pressure on the user's head, so that the acoustic output device 300 is firmly fixed on a specific position of the user's head. In some embodiments, the elastic band may be a discontinuous band. For example, the elastic band may include a rigid portion and a flexible portion, wherein the rigid portion may be made of a rigid material (e.g., plastic or metal), and the rigid portion may be fixed with the housing structure 310 of the acoustic output device 300 by means of physical connection (e.g., snap connection, screw connection, etc.). The flexible portion may be made of elastic material (e.g., cloth, composite materials, or/and neoprene).

The acoustic driver 320 may be an element that may receive electrical signals and convert them into sound signals for output. In some embodiments, differentiated by frequency, the types of acoustic drivers 320 may include a low frequency (e.g., below 3 kHz) acoustic driver, a mid-high frequency (e.g., 3 kHz-7 kHz) acoustic driver or a high frequency (e.g., greater than 7 kHz) acoustic driver, or any combination thereof. The low frequency, the high frequency, etc. mentioned here only represent approximate ranges of frequencies, and in different application scenarios, there may be different division methods. For example, a crossover point may be determined, wherein the low frequency represents the frequency range below the crossover point, and the high frequency represents the frequency range above the crossover point. The crossover point may be any value within the audible range of the human ear, for example, 500 Hz, 600 Hz, 700 Hz, 800 Hz, 1000 Hz, etc. In some embodiments, the acoustic driver 320 may include a moving coil type, a moving iron type, a piezoelectric type, an electrostatic type, a magnetostrictive type, and/or other drivers.

The acoustic driver 320 may include a diaphragm 321 and a magnetic circuit structure 3220. The diaphragm 321 and the magnetic circuit structure 3220 are disposed in sequence along the vibration direction of the diaphragm 321. In some embodiments, the diaphragm 321 may be mounted on a basin frame (not shown in the figure), and the basin frame may be then fixed on the magnetic circuit structure 3220. Alternatively, the diaphragm 321 may be directly and fixedly connected to the side wall of the magnetic circuit structure 3220. A side of the diaphragm 321 facing away from the magnetic circuit structure 3220 may form a front side of the acoustic driver 320, and a side of the magnetic circuit structure 3220 facing away from the diaphragm 321 may form a back side of the acoustic driver 320, the diaphragm 321 may vibrate so that the acoustic driver 320 radiates sounds outward from its front and back, respectively.

The back side of the acoustic driver 320 and the housing structure 310 may form a back cavity 311. The back side of the acoustic driver 320 may radiate sound toward the back cavity 311. In some embodiments, the housing structure 310 may be disposed with one or more first sound outlet holes 312. The first sound outlet holes 312 may be acoustically coupled with the back cavity 311, and output the sound radiated to the back cavity 311 by the acoustic driver 320 to the outside of the acoustic output device 300.

In some embodiments, the diaphragm 321 may be embedded in the side wall of the housing structure 310. For example, a mounting hole (not shown in the figure) may be opened on the side wall of the housing structure 310, and the end of the diaphragm 321 may be fixed at the mounting hole.

Refer to FIG. 3 again, in some embodiments, the side walls of the back cavity 311 may include a first side wall 3101, a second side wall 3102, and a third side wall 3103. The second side wall 3102 and the third side wall 3103 are opposite to each other. The first side wall 3101 may refer to the side wall surrounding an axis, wherein the axis is a line extending from the front center of the acoustic driver 120 to the back center of the acoustic driver 120 as the axis, and may also be referred to as the peripheral side wall of the back cavity 311. In some embodiments, the first side wall 3101 may be one or more. For example, when the housing structure 310 is a cylinder, the first side wall 3101 may be an annular circumferential side wall of the cylinder. As another example, when the housing structure 310 is a cuboid, the first side wall 3101 may include four mutually connected peripheral side walls of the cuboid. The second side wall 1102 may refer to the side wall on the left side of the plan view shown in FIG. 3, which is disposed opposite to the back side of the acoustic driver 320, and may also be referred to as the bottom side wall of the back cavity 311. The third side wall 3103 may refer to the side wall on the right side of the plan view shown in FIG. 3. In some alternative embodiments, the side walls of the back cavity 311 may include only the first side wall 3101 and the second side wall 3102. In some embodiments, the housing structure 310 may further include a first sound outlet hole 312, and the first sound outlet hole 312 may be located on the first side wall 3101 and communicated with the back cavity 311. The sound generated at the back side of the acoustic driver 320 may be transmitted to the outside through the first sound outlet hole 312. Within a specific frequency range, the sound output from the first sound outlet hole 312 and the sound output from the diaphragm 321 may form dual sound sources that meet specific conditions (for example, have opposite phases and the same amplitude). In the far field, the sound output from the first sound outlet hole 312 may cancel the sound output from the diaphragm 321, further, the sound leakage volume of the acoustic output device in the far field is reduced, so as to prevent other users from hearing the sound emitted by the acoustic output device. In some embodiments, the first sound outlet hole 312 may also be located on the second side wall 3102 and communicate with the back cavity 311. The diaphragm 321 in FIG. 3 is similar to the diaphragm 121 in FIG. 1, and will not be described further herein.

Refer to FIG. 3 again, different from the back cavity 111 shown in FIG. 1, different side walls (e.g., the first side wall 3101 and the second side wall 3102) of the back cavity 311 are connected by a curved structure 3111. For example, the end of the first side wall 3101 away from the acoustic driver may be connected to the end of the second side wall 3102 through the curved structure 3111. The curved structure 3111 may change the reflection conditions of the inside of the back cavity 311 with respect to the sound emitted from the back side of the acoustic driver 320. According to formula (1), setting the curved structure 3111 is equivalent to reducing the length l of the long side of the back cavity, so that the frequency of the sound forming the standing waves is within in the higher frequency region. The "connection" mentioned in this present disclosure may refer to splicing different components together in a specific manner, or a fixed connection between different parts of the same component. For example, in some embodiments, the curved structure 3111 may be integrally formed with the first side wall 3101, and the curved structure 3111 may be fixedly connected to the second side wall 3102 by means of bonding or clamping. In some alternative embodiments, the curved structure 3111 may be integrally formed with the second side wall 3102, and the curved structure 3111 may be fixedly connected to the first side wall 3101 by means of bonding or clamping. In some alternative embodiments, the curved structure 3111, the first side wall 3101, and the second side wall 3102 may be integrally formed together.

It should be noted that, in some embodiments of this specification, the above-mentioned curved structure 3111 may refer to a structure having a certain radian. The plane where the first side wall 3101 is located and the plane where the second side wall 3102 is located may be tangent to the curved structure 3111, respectively. In some embodiments, the curved structure 3111 may be convex or concave relative to the back cavity 311. In some embodiments, the connections between the curved structure and different side walls may have the same bending arc and/or the same bending direction, or different bending arcs and/or the bending directions. In some embodiments, the curvature range of the curved structure with a certain radian may be 50 $m^{-1}$-100 $m^{-1}$, when the acoustic output device adopts the curved structure with this curvature range, the frequency range corresponding to the high frequency resonance peak may be 4 kHz-6 kHz. In some embodiments, the frequency corresponding to the high frequency resonance peak of the back cavity of the acoustic output device may be adjusted by adjusting the curvature of the curved structure. For example, when the curvature range of the curved structure is about 67 $m^{-1}$, the frequency corresponding to the high-frequency resonance peak of the back cavity of the acoustic output device may be 5 kHz.

It should be noted that the above description of the curved structure is only an example, in some other embodiments of the present disclosure, in addition to disposing a curved structure between different side walls of the back cavity to suppress standing waves, convex structures of different shapes may also be disposed inside the back cavity. The convex structures may also break the reflection of sound by the internal structure of the back cavity, and at the same time, it is equivalent to reducing the length l of the long side of the back cavity.

Figure 4:
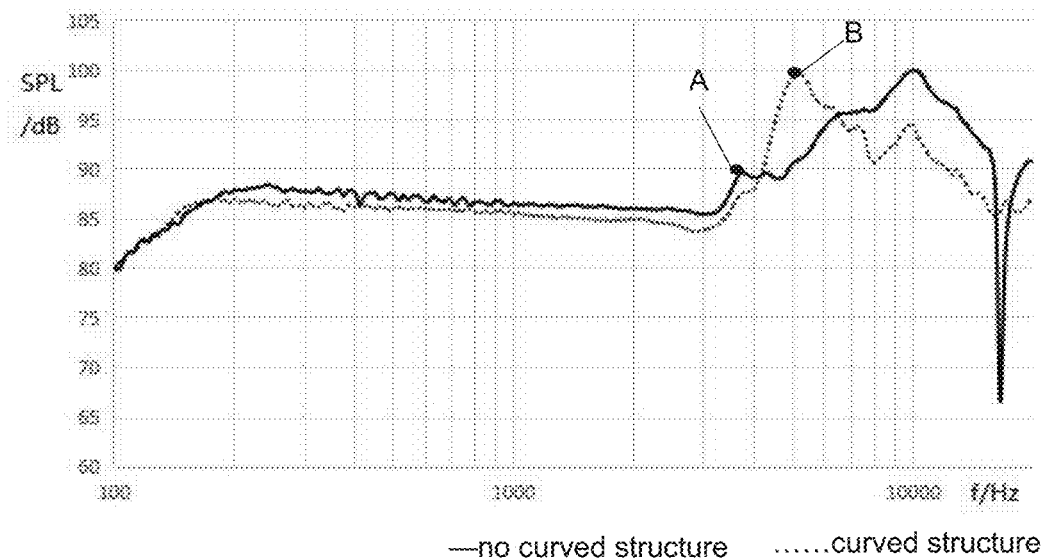
FIG. 4 is a schematic diagram illustrating a frequency response curve of an acoustic output device according to some other embodiments of the present disclosure.

FIG. 4 is a schematic diagram illustrating a frequency response curve of the back cavity of the acoustic output device provided based on the above-mentioned FIGS. 1 and 3. As shown in FIG. 4, in the frequency response curve of the first sound outlet hole 312 (the curve corresponding to "curved structure" shown in FIG. 4) obtained by setting the curved structure 3111 at the connection between the first side wall 3101 and the second side wall 3102 of the back cavity 311, the high frequency resonance peak is located at point B corresponding to a frequency of about 5.2 kHz. In the frequency response curve of the first sound outlet obtained by not setting the curved structure 3111 at the connection between the first side wall 1101 and the second side wall 1102 (the curve corresponding to "no curved structure" shown in FIG. 4), the high-frequency resonance peak is located at point A corresponding to a frequency of about 3.7 kHz. It can be seen that the setting of the curved structure 3111 at the connection between the first side wall 3101 and the second side wall 3102 of the housing structure 310 may increase the frequency corresponding to the high frequency resonance peak of the sound acoustic curve at the first sound outlet hole 312. Thereby, the frequency spectrum of the sound at the first sound outlet hole 312 is widened, so that the sound at the first sound outlet hole 312 and the sound radiated outward from the diaphragm 321 are more likely to form dual sound sources that meet specific conditions (for example, have opposite phases and the same amplitude), and the sound leakage volume of the acoustic output device in the far field is effectively reduced. In addition, by setting a curved structure at the connection between the first side wall and the second side wall, the volume of the back cavity 311 may be reduced. On the one hand, the resonance peak of the back cavity is moved to a higher frequency region, and on the other hand, more sound energy of the sound emitted from the back side of the acoustic driver 320 may be radiated from the sound outlet hole (for example, the first sound outlet hole 312).

Figure 5:
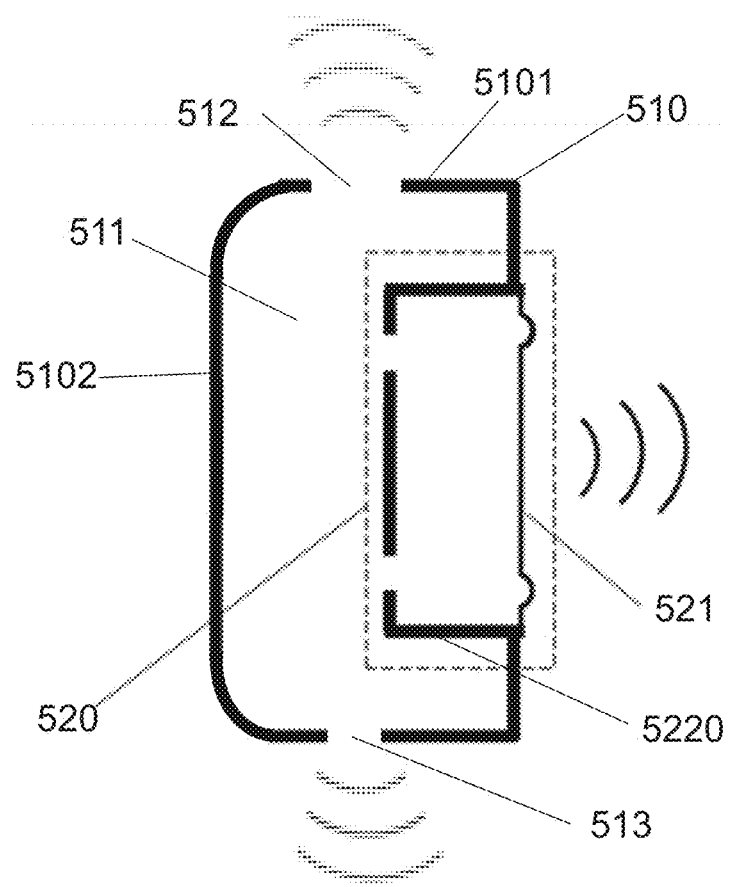
FIG. 5 is an exemplary structural schematic diagram illustrating an acoustic output device according to some embodiments of the present disclosure.

FIG. 5 is an exemplary structural schematic diagram illustrating an acoustic output device according to some other embodiments of the present disclosure. The structure of an acoustic output device 500 shown in FIG. 5 is substantially the same as that of the acoustic output device 300 shown in FIG. 3, and the biggest difference between the two is that the acoustic output device 500 shown in FIG. 5 further includes a second sound outlet hole 513 (also referred to as a tuning hole).

Referring to FIG. 5, in some embodiments, in order to further increase the frequency corresponding to the high frequency resonance peak in the frequency response curve of a sound outlet hole (for example, the first sound outlet hole), the back cavity 511 of the acoustic output device 500 may include a first sound outlet hole 512 and a second sound outlet hole 513. The first sound outlet hole 512 and the second sound outlet hole 513 may be respectively located on a first side wall 5101 of a back cavity 511. In some embodiments, the second sound outlet hole 513 and the first sound outlet hole 512 may be disposed on the first side wall 5101 of the back cavity 511. For example, the first sound outlet hole 512 is located at the top side wall of the housing structure 510 as shown in FIG. 5, and the second sound outlet hole 513 is located at the bottom side wall of the housing structure 510 as shown in FIG. 5. The connection line between the first sound outlet hole 512 and the second sound outlet hole 513 may pass through the back cavity 511. In some embodiments, the projection of the first sound outlet hole 512 on the bottom side wall of the housing structure 510 may overlap with the second sound outlet hole 513. In some embodiments, the positions of the second sound outlet hole 513 and the first sound outlet hole 512 may not be set relative to each other. For example, the first sound outlet hole 512 and the second sound outlet hole 513 may be staggered along the length direction of the peripheral side wall of the back cavity 511 (the direction from left to right in FIG. 5). As another example, the first sound outlet hole 512 and the second sound outlet hole 513 are distributed along the circumferential direction of the peripheral side wall of the back cavity 511. The positions of the first side wall 5101 where the first sound outlet hole 512 and the second sound outlet hole 513 are located may be adaptively adjusted according to the shape of the housing structure 510.

For example, when the housing structure 510 is a cylinder, the first side wall 5101 may be an annular peripheral side wall of a cylinder, the first sound outlet hole 512 and the second sound outlet hole 513 may be located at different positions on the annular circumferential sidewall of the cylinder. As another example, when the housing structure 510 is a cuboid, the first sound outlet hole 512 and the second sound outlet hole 513 may be on the same peripheral side wall, or different peripheral side walls of the first side wall 1101 that are connected to each other. In some embodiments, the first sound outlet hole 512 is located at the first side wall 5101 of the housing structure 510, and the second sound outlet hole 513 is located at the second side wall 5102 of the housing structure 510. In some embodiments, the count of second sound outlet holes 513 may be one or more.

It should be noted that the acoustic output device shown in FIG. 5 may further include an acoustic driver 520 and other structures, wherein the acoustic driver 520 may include a diaphragm 521 and a magnetic circuit structure 5220. For more details about the diaphragm 521 and the magnetic circuit structure 5220, please refer to other portions of this present disclosure (e.g., FIG. 3, FIG. 7, FIG. 8, FIG. 11 and related discussions), which will not be repeated here.

For example, the second sound outlet hole 513 and the first sound outlet hole 512 may be respectively disposed on the opposite first side walls 5101 of the back cavity. In such cases, a condition for forming standing waves in the back cavity may be represented as:

$$f_2 = \frac{c_0}{2l}, \quad (2)$$

wherein $c_0$ represents the speed of sound in the air, $l$ represents the length of the long side of the back cavity, and $f_2$ represents the frequency of the standing waves. Based on formula (1) and formula (2), it can be seen that, the frequency corresponding to the high frequency resonance peak of the back cavity when the second sound outlet hole 513 is disposed at a position opposite to the first sound outlet hole 512 is approximately doubled compared to the frequency corresponding to the high frequency resonance peak when there is only the first sound outlet hole 512. The frequency spectrum of the first sound outlet hole 512 may be greatly broadened by setting the second sound outlet hole 513.

Figure 6:
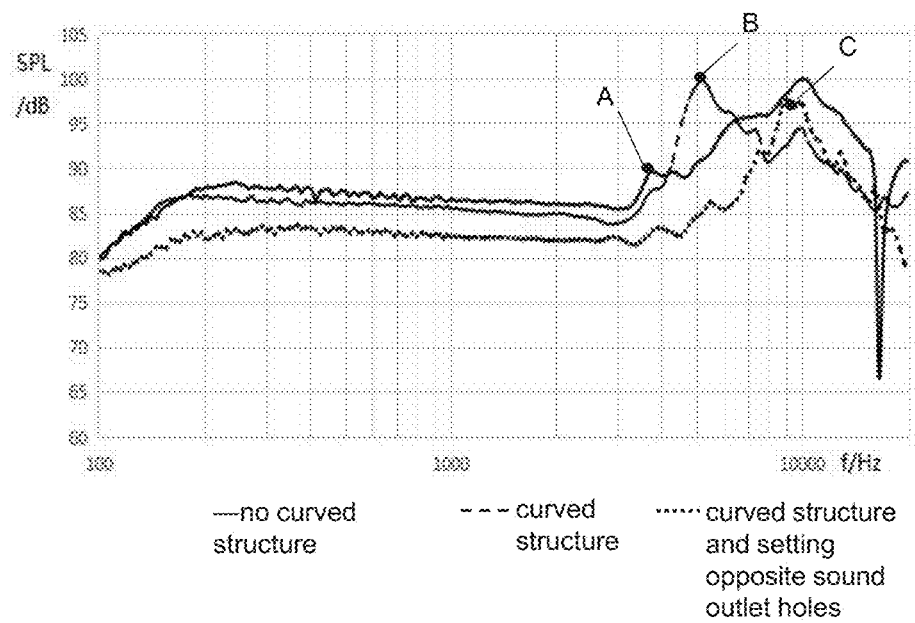
FIG. 6 is a schematic diagram illustrating a frequency response curve of an acoustic output device according to some other embodiments of the present disclosure.

FIG. 6 is a schematic diagram illustrating a frequency response curve of the back cavity of the acoustic output device provided based on the above-mentioned FIGS. 1, 3, and 5. It can be seen from FIG. 6 that, when a curved structure is disposed at the connection between the first side wall and the second side wall and a second sound outlet hole is configured at a position opposite to the first sound outlet hole at the first side wall of the housing structure, the obtained frequency response curve (the frequency response curve corresponding to the "curved structure and setting opposite sound outlet hole" shown in FIG. 6) has a high-frequency resonance peak at point C, and the corresponding frequency is increased to above 9 kHz. The high-frequency resonance peak at point C is much higher than the frequency corresponding to the high-frequency resonance peak of the back cavity (for example, a high-frequency resonance peak at point A) when no curved structure is disposed at the connection between the first side wall and the second side wall and the second sound outlet hole ("no curved structure" shown in FIG. 6), and higher than the frequency corresponding to the high frequency resonance peak of the back cavity (for example, a high-frequency resonance peak at point B) when a curved structure is disposed at the connection between the first side wall and the second side wall and the second sound outlet hole ("curved structure" shown in FIG. 6).

In some embodiments, the acoustic output effect of the acoustic output device at high frequencies may be improved by adjusting the size of a sound outlet hole. Specifically, if the size of the sound outlet hole is enlarged, the position of the resonance peak may move toward the end of the frequency response of the sound outlet hole (or the back cavity) (i.e., the response frequency is increased). In some embodiments, the cross-sectional area of the sound outlet hole may be not less than 0.25 mm$^2$; preferably, the cross-sectional area of the sound outlet hole may be not less than 0.5 mm$^2$; preferably, the cross-section area of the sound outlet hole may be not less than 1 mm$^2$; preferably, the cross-section area of the sound outlet hole may be not less than 2 mm$^2$; preferably, the cross-section area of the sound outlet hole may be not less than 4 mm$^2$; more preferably, the cross-section area of the sound outlet hole may be not less than 7 mm$^2$; more preferably, the cross-sectional area of the sound outlet hole may be not less than 10 mm$^2$. In some embodiments, by setting the cross-sectional area of the sound outlet hole, the frequency of the resonance peak in the frequency response of the sound outlet hole may be not less than 3 kHz; preferably, by setting the cross-sectional area of the sound outlet hole, the frequency of the resonance peak in the frequency response of the sound outlet hole may be made not less than 4 kHz; more preferably, by setting the cross-sectional area of the sound outlet hole, the frequency of the resonance peak in the frequency response of the sound outlet hole may be made not less than 5 kHz.

In some embodiments, in order to reduce the influence of the partial pressure effect of the second sound outlet hole on the volume at the first sound outlet hole, the cross-sectional area of the second sound outlet hole may be smaller than or equal to the cross-sectional area of the first sound outlet hole. Preferably, in order to suppress standing waves of the first sound outlet hole while reducing the influence of the partial pressure effect of the second sound outlet hole on the volume at the first sound outlet hole, the ratio of the cross-sectional area of the second sound outlet hole to the cross-sectional area of the first sound outlet hole may be 0.25-0.5. For example, when the cross-sectional area of the first sound outlet hole is 4 mm$^2$, the cross-sectional area of the second sound outlet hole may be designed to be 1 mm$^2$, 2 mm$^2$, or another value less than or equal to 4 mm$^2$.

It should be noted that the above-mentioned numerical values about the cross-sectional area of the first sound outlet hole and the second sound outlet hole are only examples. In some embodiments of the present disclosure, the cross-sectional area of the first sound outlet hole may be any value not less than 0.25 mm$^2$, the cross-sectional area of the second sound outlet hole may be any value not greater than the cross-sectional area of the first sound outlet hole, which is not specifically limited in this present disclosure.

In some embodiments, the impedance of a sound outlet hole of the acoustic output device may be adjusted to reduce the sound leakage of the acoustic output device in the mid-low frequency band (for example, 500 Hz-3 kHz). For example, a sound damping structure (e.g., a tuning net, a tuning cotton, a sound guide tube, etc.) may be disposed at the first sound outlet hole 512 and/or the second sound outlet hole 513 to adjust the amplitude of the corresponding frequency responses of the two sound holes, so that the frequency response corresponding to the first sound outlet hole 512 is closer to the frequency response corresponding to the front side of the acoustic driver 520 (at the diaphragm) in the mid-low frequency range, thereby further reducing the sound leakage volume of the acoustic output device in the mid-low frequency range.

Figure 7:
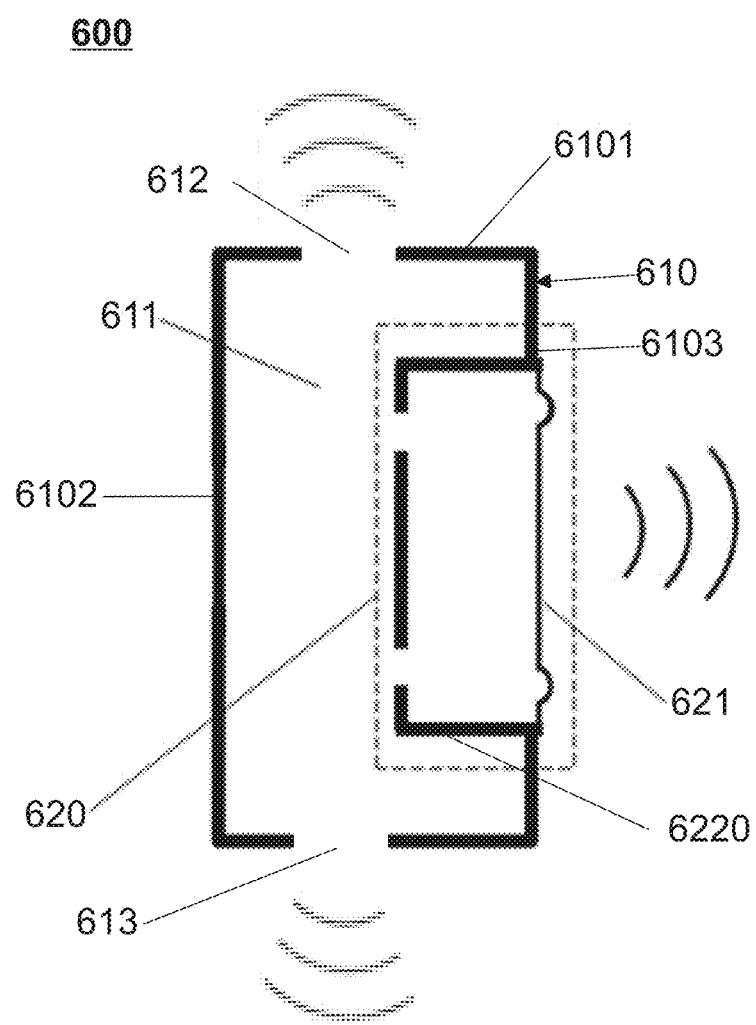
FIG. 7 is an exemplary structural schematic diagram illustrating an acoustic output device according to some embodiments of the present disclosure.

FIG. 7 is an exemplary structural schematic diagram illustrating an acoustic output device according to some other embodiments of the present disclosure. The structure of an acoustic output device 600 shown in FIG. 7 is substantially the same as that of the acoustic output device 500 shown in FIG. 5, and the difference is that the acoustic output device 600 shown in FIG. 7 is not provided with a curved structure.

Refer to FIG. 7, in some embodiments, in order to further increase the frequency corresponding to the high frequency resonance peak in the frequency response curve at the sound outlet hole (e.g., the first sound outlet hole), a back cavity 611 of the acoustic output device 700 may include a first sound outlet hole 612 and a second sound outlet hole 613. The first sound outlet hole 612 and the second sound outlet hole 613 may be located on the first side wall 6101 of the back cavity 611, respectively. In some embodiments, the second sound outlet hole 613 and the first sound outlet hole 612 may be disposed on the first side wall 6101 of the back cavity 611. For example, the first sound outlet hole 612 is located at the upper side wall of the housing structure 510 shown in FIG. 7, and the second sound outlet hole 613 may be located at the bottom side wall of the housing structure 610 shown in FIG. 7. The connection line between the first sound outlet hole 612 and the second sound outlet hole 613 may pass through the back cavity 611. In some embodiments, the projection of the first sound outlet hole 612 on the side wall below the housing structure 610 overlaps with the second sound outlet hole 613. In some embodiments, the second sound outlet hole 613 and the first sound outlet hole 612 may not be set relative to each other. For example, the first sound outlet hole 612 and the second sound outlet hole 613 may be staggered along the length direction of the peripheral side wall of the back cavity 611 (the direction from left to right in FIG. 7). As another example, the first sound outlet hole 612 and the second sound outlet hole 613 may be distributed along the circumferential direction of the peripheral side wall of the back cavity 611. The positions of the first side wall 6101 where the first sound outlet hole 612 and the second sound outlet hole 613 are located may be adaptively adjusted according to the shape of the housing structure 610. For example, when the housing structure 610 is a cylinder, the first side wall 6101 may be an annular peripheral side wall of a cylinder, the first sound outlet hole 612 and the second sound outlet hole 613 may be located at different positions on the annular circumferential sidewall of the cylinder. As another example, when the housing structure 610 is a cuboid, the first sound outlet hole 612 and the second sound outlet hole 613 may be on the same or different peripheral side walls of the first side wall 6101 that are connected to each other. In some embodiments, the first sound outlet hole 612 may be located at the first side wall 6101 of the housing structure 610, and the second sound outlet hole 613 may be located at the second side wall 6102 of the housing structure 510. In some embodiments, the count of the second sound outlet hole 613 may be one or more.

It should be noted that the acoustic output device shown in FIG. 7 may further include an acoustic driver 620 and other structures, wherein the acoustic driver 620 may include a diaphragm 61 and a magnetic circuit structure 6220. For more details about the diaphragm 621 and the magnetic circuit structure 6220, please refer to other portions of this present disclosure (e.g., FIG. 3, FIG. 7, FIG. 8, FIG. 11 and related discussions), which will not be repeated here.

Figure 8:
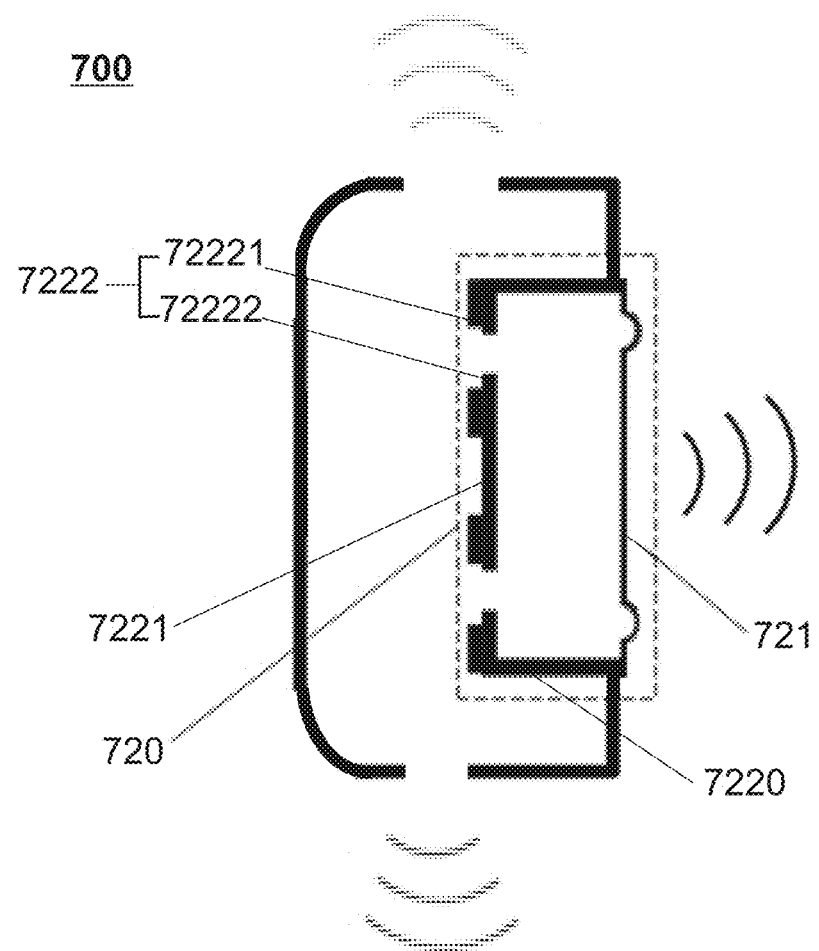
FIG. 8 is an exemplary structural schematic diagram illustrating an acoustic output device according to some embodiments of the present disclosure.

FIG. 8 is an exemplary structural schematic diagram illustrating an acoustic output device according to some other embodiments of the present disclosure. An acoustic output device 700 shown in FIG. 8 has substantially the same structure as the acoustic output device 500 shown in FIG. 5, and the difference is that a magnetic circuit structure 7220 of the acoustic output device 700 shown in FIG. 8 is different from the magnetic circuit structure 5220 shown in FIG. 5.

Referring to FIG. 8, in some embodiments, the magnetic circuit structure 7220 may include a magnetic conductive plate 7221 disposed opposite to a diaphragm 721. The magnetic conductive plate 7221 is provided with one or more third sound outlet holes 7222 (also referred to as pressure relief holes). The third sound outlet hole 7222 may export the sound generated by the vibration of the diaphragm 721 from the back side of the acoustic driver 720 to the outside of the acoustic output device.

In some embodiments, the third sound outlet hole 7222 may include a first hole portion 72222 and a second hole portion 72221 which are sequentially disposed from inside to outside. The first hole portion 72222 and the second hole portion 72221 pass through, and the size of the second hole portion 72221 is different from that of the first hole portion 72222. For example, when the first hole portion 72222 and the second hole portion 72221 are both circular, the diameter of the second hole portion 72221 may be larger or smaller than the diameter of the first hole portion 72222. It should be noted that, the shape of the first hole portion 72222 and the second hole portion 72221 of the third sound outlet hole 7222 described above is not limited to a circle, but can also be a semicircle, a quarter circle, an ellipse, a semi-ellipse, a polygon, etc., which is not further limited here.

It should be noted that disposing the first hole portion 72222 and the second hole portion 72221 at the position of the third sound output hole 7222 may adjust the frequency response of the sound radiating outward from the back side of the acoustic driver 720 (i.e., radiating sound from the third sound output hole 7222 to the outside). In some alternative embodiments, the third sound outlet hole 7222 may be a hole whose cross-sectional area gradually increases or decreases from the inside to the outside. In some alternative embodiments, the third sound outlet hole 7222 may also be a hole whose cross-sectional area gradually increases or decreases from the inside to the outside. Different third sound output holes 7222 may have the same or different structural settings. In some embodiments, the acoustic output device 300 and/or the acoustic output device 500 may have the same magnetic circuit structure as or similar magnetic circuit structure to the magnetic circuit structure 7220 therein.

Figure 9:
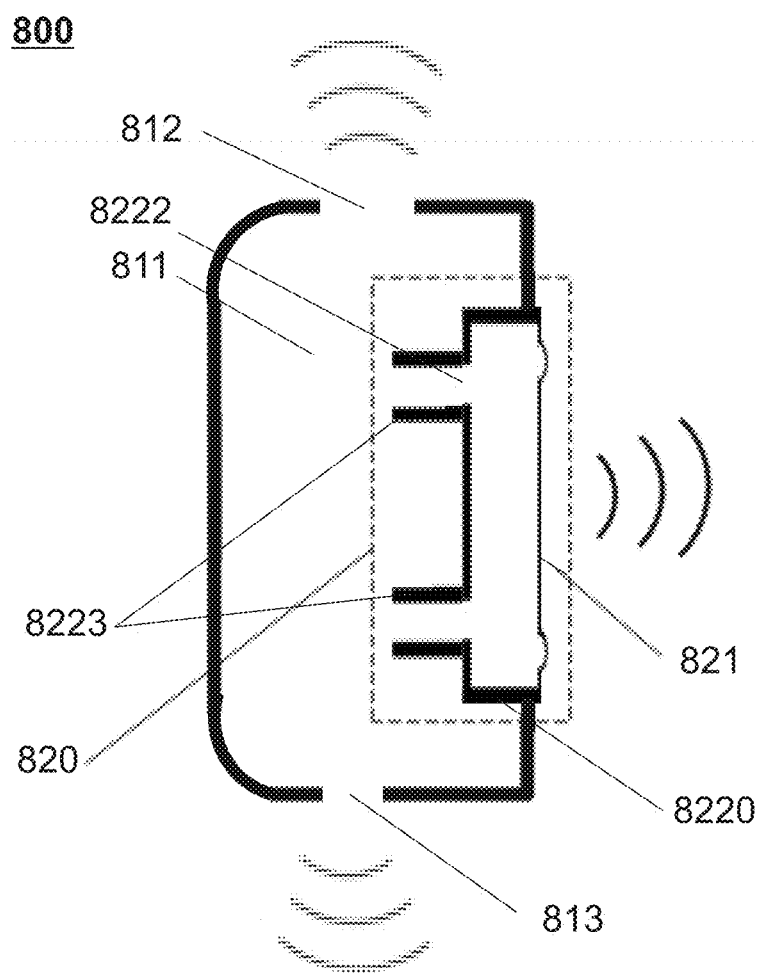
FIG. 9 is an exemplary structural schematic diagram illustrating an acoustic output device according to some embodiments of the present disclosure.

FIG. 9 is an exemplary structural schematic diagram illustrating an acoustic output device according to some other embodiments of the present disclosure. An acoustic output device 800 shown in FIG. 9 has substantially the same structure as the acoustic output device 700 shown in FIG. 8, and the difference is that a magnetic circuit structure 8220 of the acoustic output device 800 shown in FIG. 9 is different from the magnetic circuit structure 7220 shown in FIG. 8.

As shown in FIG. 9, in some embodiments, a sound guide tube 8223 may be provided at a third sound outlet hole 8222. The sound guide tube 8223 may be disposed in a direction away from the diaphragm 821, that is, the sound guide tube 8223 may extend from the third sound outlet hole 8222 to the outside of the acoustic output device. In some embodiments, the sound guide tube 8223 may distribute the sound radiated from the third sound outlet hole 8222 to the back cavity 811, then the sound guide tube 8223 may guide the sound radiated from the third sound output hole 8222 to the outside of the acoustic output device through the first sound output hole 812 and/or the second sound output hole 813. In some embodiments, the sound guide tube 8223 at the third sound outlet hole 8222 may adjust the frequency response of the sound radiated from the back side of an acoustic driver 820 to the outside (i.e., the sound is radiated from the third sound outlet hole 8222 to the outside). For example, the frequency response corresponding to the sound guide tube 8223 may be adjusted by adjusting the diameter or cross-sectional area of the sound guide tube. In some embodiments, the sound guide tube 8223 may be a straight tube or a tube body structure with an increasing cross-sectional area along the direction away from the diaphragm 821. In some embodiments, the acoustic output device 300 and/or the acoustic output device 500 may have a magnetic circuit structure that is the same as or similar to the magnetic circuit structure 8220.

Figure 10:
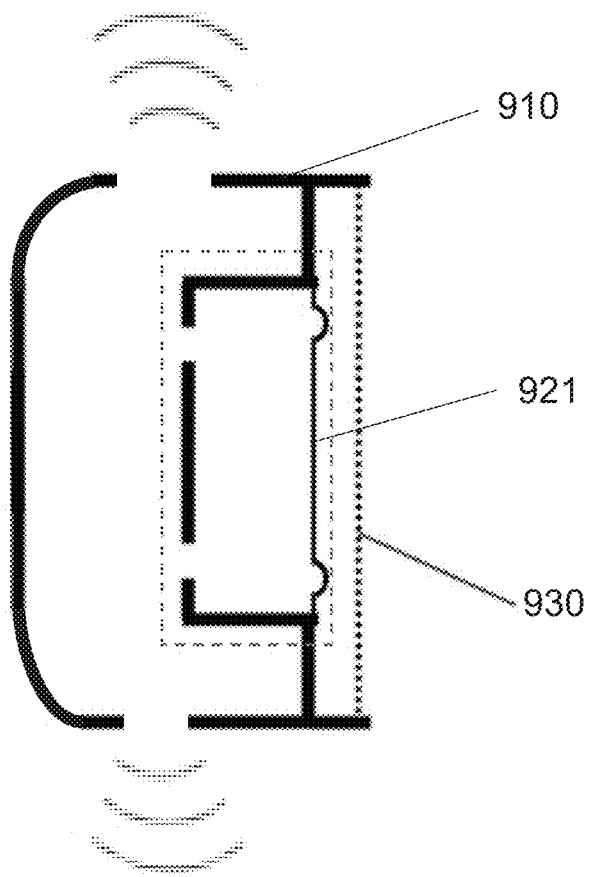
FIG. 10 is an exemplary structural schematic diagram illustrating an acoustic output device according to some embodiments of the present disclosure.

FIG. 10 is an exemplary structural schematic diagram illustrating an acoustic output device according to some other embodiments of the present disclosure. An acoustic output device 900 shown in FIG. 10 has substantially the same structure as the acoustic output device 500 shown in FIG. 5, the difference is that the acoustic output device 900 shown in FIG. 10 further includes a protective structure.

As shown in FIG. 10, in some embodiments, in order to protect a diaphragm 921, a protective structure 930 may be further provided on the outer side of the diaphragm 921. The protective structure 930 may be fixedly connected to the housing structure 910. In some embodiments, the protective structure 930 is a structure that allows sound waves generated on the front side of the diaphragm 921 to communicate to the outside world. For example, the protective structure 930 may be a filter structure. As another example, the protective structure 930 may be a plate body structure with holes, or the like. In some embodiments, there is a certain distance between the protective structure 930 and the front side of the diaphragm 921, and the distance may prevent the diaphragm 921 from colliding with the protective structure 930 during the vibration process. For more descriptions regarding the type and structure of the diaphragm 921, please refer to the diaphragm shown in FIG. 12 of the present disclosure, and details are not described here. In some embodiments, the acoustic output device 300, the acoustic output device 500, the acoustic output device 600, the acoustic output device 700, and/or the acoustic output device 800 may have protective structures that are the same as or similar to the protective structure 930.

Figure 11:
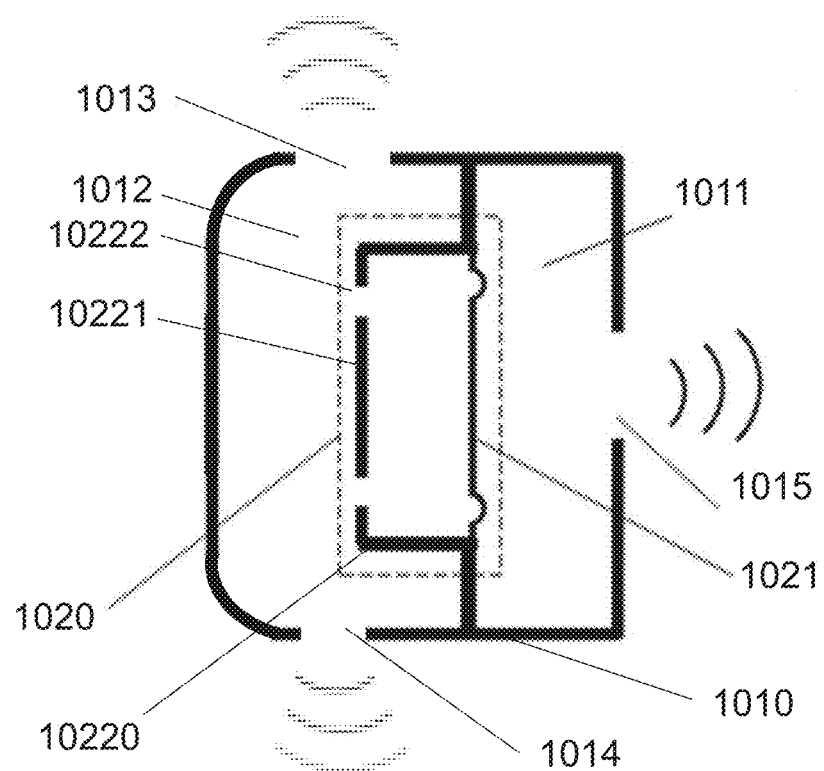
FIG. 11 is an exemplary structural schematic diagram illustrating an acoustic output device according to some embodiments of the present disclosure.

FIG. 11 is an exemplary structural schematic diagram illustrating an acoustic output device according to some other embodiments of the present disclosure. The structure of an acoustic output device 1000 shown in FIG. 11 is substantially the same as that of the acoustic output device 500 shown in FIG. 5, and the main difference is that the acoustic output device 1000 shown in FIG. 11 further includes a front cavity.

As shown in FIG. 11, the acoustic output device 1000 may include a housing structure 1010 that is hollow inside and an acoustic driver 1020 disposed within the housing structure 1010. The acoustic driver 1020 may include a diaphragm 1021 and a magnetic circuit structure 10220. The acoustic driver 1020 may also include a voice coil (not shown). The voice coil may be fixed on the side of the diaphragm 1021 facing the magnetic circuit structure 10220 and located in the magnetic field formed by the magnetic circuit structure 10220. When the voice coil is energized, it may vibrate under the action of the magnetic field and drive the diaphragm 1021 to vibrate, thereby generating sound. For the convenience of description, the side of the diaphragm 1021 facing away from the magnetic circuit structure 10220 (i.e., the right side of the diaphragm 1021 in FIG. 10) may be regarded as the front side of the acoustic driver 1020, the side of the magnetic circuit structure 10220 facing away from the diaphragm 1021 (i.e., the left side of the magnetic circuit structure 10220 in FIG. 10) may be regarded as the back side of the acoustic driver 1020. The vibration of the diaphragm 1021 may cause the acoustic driver 1020 to radiate sound outward from its front and back, respectively. As shown in FIG. 10, the front side or diaphragm 1021 of the acoustic driver 1020 and the housing structure 1010 form a first cavity 1011 (also referred to as a front cavity), and the back side of the acoustic driver 1020 and the housing structure 1010 form a second cavity 1012 (also referred to as a back cavity). The front side of the acoustic driver 1020 radiates sound toward the first cavity 1011, and the back side of the acoustic driver 1020 radiates sound toward the second cavity 1012. In some embodiments, the housing structure 1010 may further include a first sound outlet hole 1013, a second sound outlet hole 1014, and a fourth sound outlet hole 1015, the fourth sound outlet hole 1015 communicates with the first cavity 1011, and the first sound outlet hole 1013 and the second sound outlet hole 1014 communicate with the second cavity 1012. The sound generated on the front side of the acoustic driver 1020 is communicated to the outside through the fourth sound outlet hole 1015, and the sound generated on the back side of the acoustic driver 120 is communicated to the outside through the first sound outlet hole 1013 and the second sound outlet hole 1014. In some embodiments, the magnetic circuit structure 10220 may include a magnetic conductive plate 10221 disposed opposite to the diaphragm. At least one third sound outlet hole 10222 (also called at least one pressure relief hole) is opened on the magnetic conductive plate 10221, which is used to export the sound generated by the vibration of the diaphragm 1021 from the back side of the acoustic driver 1020 and transmit it to the outside through the second cavity 1012. The acoustic output device 1000 forms a specific sound field with a certain directivity through the sound radiation of the fourth sound output hole 1015, the first sound output hole 1013, and the second sound output hole 1014. It should be noted that, the acoustic output device in the embodiments of the present disclosure is not limited to the application of earphones, and may also be applied to other audio output devices (e.g., hearing aids, loudspeakers, etc.). In some embodiments, the first cavity 1011 (front cavity) and its related structures (e.g., the fourth sound outlet hole 1015) may also be applied to the above-mentioned acoustic output device 300, the acoustic output device 500, the acoustic output device 600, the acoustic output device 700, and/or the acoustic output device 800.

Similar to the above-mentioned first sound outlet hole and second sound outlet hole, in some embodiments, a damping structure (for example, a tuning net, a tuning cotton, a sound guide tube, etc.) may also be disposed at the above-mentioned fourth sound outlet hole, so that the amplitude of the frequency response corresponding to the sound hole is adjusted, the sound leakage volume of the acoustic output device in the middle and low frequencies is further reduced.

It should be noted, in the embodiments of the present application, the count of first sound outlet holes, second sound outlet holes, third sound outlet holes, and fourth sound outlet holes may be one or more, those skilled in the art can make adaptive adjustments to the number and shape of the first sound outlet hole, the second sound outlet hole, the third sound outlet hole, and the fourth sound outlet hole according to specific conditions, which are not further limited herein. In some embodiments, the above-mentioned acoustic output device may include sound outlet holes other than the above-mentioned first sound outlet hole, second sound outlet hole, third sound outlet hole, and fourth sound outlet hole.

Figure 12:
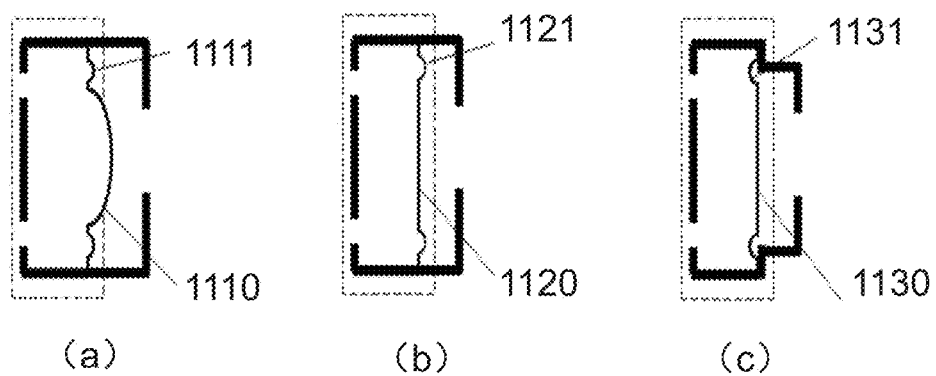
FIG. 12 is an exemplary structural schematic diagram illustrating a diaphragm of an acoustic output device according to some embodiments of the present disclosure.

FIG. 12 is an exemplary structural schematic diagram illustrating a diaphragm of an acoustic output device according to some embodiments of the present disclosure. In some embodiments, the examples of different diaphragms described in FIG. 12 may be adapted for use in acoustic output devices described elsewhere in this present disclosure (e.g., the acoustic output device 300, acoustic output device 500, the acoustic output device 600, the acoustic output device 700, the acoustic output device 800, the acoustic output device 900, the acoustic output device 1000, etc.).

In some embodiments, considering that the shape of the diaphragm also affects the volume of the cavity, and the diaphragm of the acoustic driver has a certain vibration amplitude when vibrating, while ensuring a small volume of the cavity, it is necessary to reserve a certain vibration space for the diaphragm to prevent the vibration of the diaphragm from colliding with the housing structure and causing sound breakage. Therefore, the gap between the top end of the diaphragm (i.e., the end face of the diaphragm facing the cavity) and the inner wall of the cavity facing the diaphragm needs to be larger than the vibration amplitude of the diaphragm.

Based on the above conclusions, in some embodiments, the diaphragm may be a spherical diaphragm or a conical diaphragm. As shown in FIG. 12(*a*), when the diaphragm is a spherical diaphragm or a conical diaphragm, since the top of the diaphragm 1110 and the convex ring 1111 are higher than other parts (that is, the top of the diaphragm 1110 is closer to the inner wall of the cavity), the cavity needs to have the extra volume to prevent the top of the diaphragm 1110 from colliding with the inner wall of the cavity. In some embodiments, the diaphragm may be a plane diaphragm. In the embodiments of the present disclosure, the plane diaphragm may refer to a diaphragm whose shape is a plane or an approximate plane. As shown in FIG. 12(*b*), when the diaphragm is a plane diaphragm 1120, the distance between the plane diaphragm 1120 and the inner wall of the cavity opposite to the plane diaphragm 1120 is smaller than that of the spherical diaphragm or the conical diaphragm, so that it helps to reduce the volume of the cavity. However, since a ring 1121 protrudes outward relative to the plane diaphragm 1120, a certain distance still needs to be maintained between the plane diaphragm 1120 and the inner wall of the cavity opposite to the plane diaphragm 1120. As shown in FIG. 12(*c*), in some embodiments, in order to further reduce the distance between a diaphragm 1130 and the inner wall of the cavity, a ring 1131 of the diaphragm 1130 may be recessed in the direction away from the cavity, at this time, the inner cavity of the housing structure does not need to reserve space for the ring 1131, therefore, the volume of the cavity is reduced, so that the position of the high-frequency resonance peak at the sound outlet hole on the cavity is located at a position with a higher frequency, thereby improving the acoustic output effect of the acoustic output device.

Figure 13:
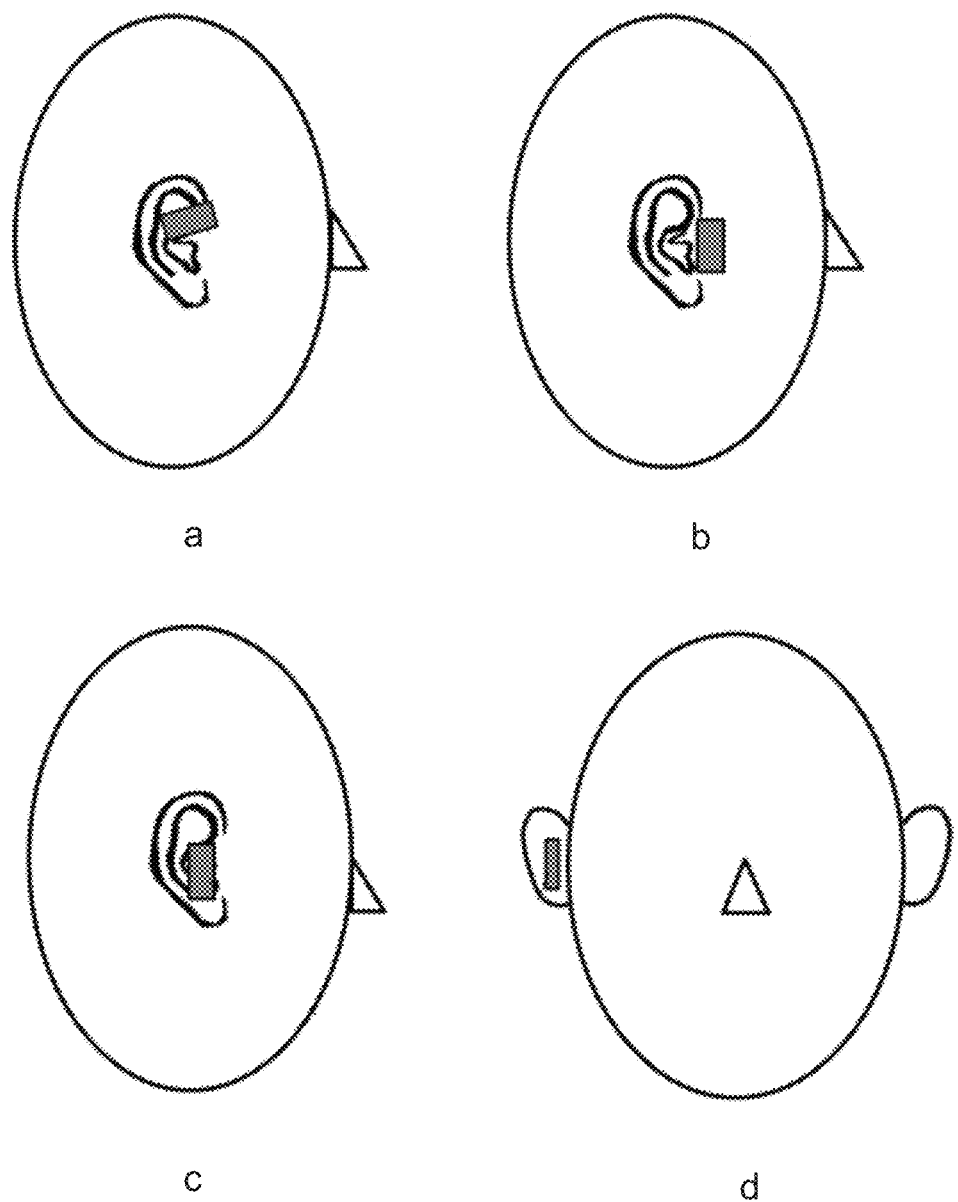
FIG. 13 is a schematic diagram illustrating an exemplary wearing effect of an acoustic output device according to some embodiments of the present disclosure.

FIG. 13 is a schematic diagram illustrating an exemplary wearing effect of an acoustic output device according to some embodiments of the present disclosure.

In some embodiments, when the user wears the above-mentioned acoustic output device, the wearing position of the acoustic output device may be the upper half of the torso of the user. For example, the wearing position is the head and close to the ears. As shown in FIG. 13, the rectangular structure in the figure represents the acoustic output device. As shown in images a and b in FIG. 13, the sound output position of the acoustic output device (e.g., a sound outlet hole, a pressure relief hole, or a diaphragm) may be within the projection of the auricle vector plane (e.g., the concha cavity) or outside the projection of the auricle vector plane. As shown in images c and d in FIG. 13, the acoustic output device may also be suspended above the ear canal through a corresponding structure (e.g., a hook), but the ear canal is not blocked.

Figure 14:
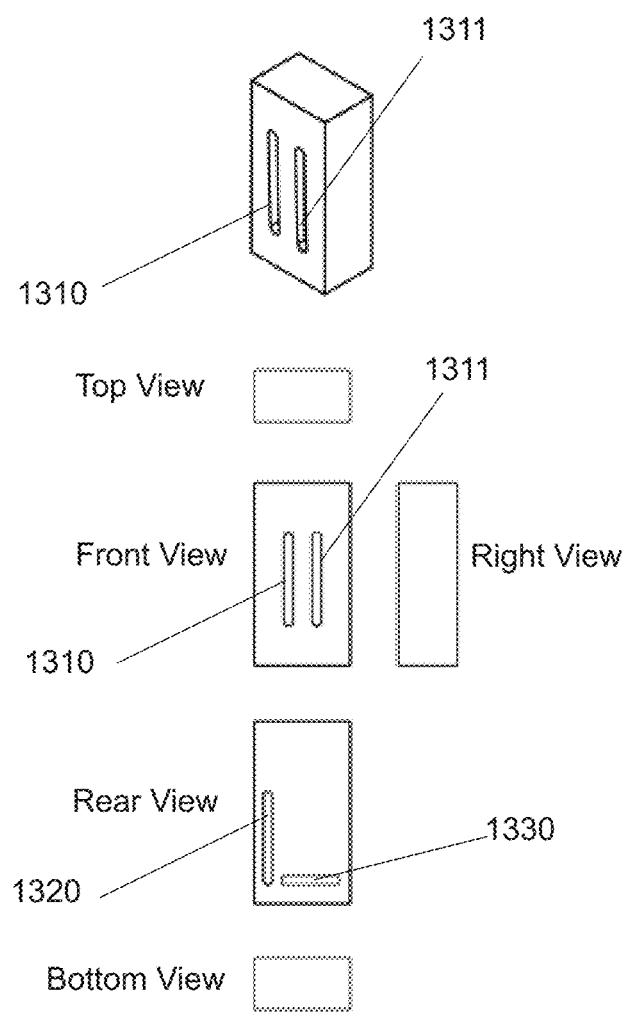
FIG. 14 is an exemplary multi-view illustrating an acoustic output device according to some embodiments of the present disclosure.

FIG. 14 is an exemplary multi-view illustrating an acoustic output device according to some embodiments of the present disclosure. As shown in FIG. 14, in some embodiments, the acoustic output device may be in the shape of a cuboid or approximately in the shape of a cuboid. In some embodiments, the above-mentioned acoustic output device may be applied to head-mounted or ear-hook devices such as glasses. When a user wears a head-mounted or ear-hook devices such as glasses, the acoustic output device is located in front of the user's ear, the surface shown in the rear view faces the user's face (hereinafter referred to as "facing the user"), the surface shown in the front view faces the position in the external environment opposite to the user's face (hereinafter referred to as "facing the outside"), and the surface shown in the right view faces the user's ears. In some embodiments, the acoustic output device includes a sound outlet hole 1310, a sound outlet hole 1311, a sound outlet hole 1320, and a sound outlet hole 1330. The sound outlet hole 1310 and the sound outlet hole 1311 are located on the side wall facing the outer side (e.g., the second side wall 5102 shown in FIG. 5) of the housing structure shown on the front side (the housing structure is represented by the three-dimensional structure in FIG. 14), the sound output hole 1320 and the sound output hole 1330 are located on the side wall of the housing structure on the side facing the user (e.g., the third side wall 3103 in FIG. 3 or the side wall on the right side shown in FIG. 11). In some embodiments, the sound outlet hole 1310 and the sound outlet hole 1311 are rectangles, and the two are disposed in parallel in the middle area of the side wall facing the outer side of the acoustic output device. The sound outlet hole 1320 and the sound outlet hole 1330 may also be rectangles, and they may be vertically disposed on the housing structure at a position facing the user side and close to the user's ear.

In some embodiments, the holes shown in the rear view (i.e., the sound output holes 1320 and 1330) may represent front cavity sound output holes (also referred to as sound output holes of the front cavity) of the acoustic output device (e.g., the sound output holes 1015 shown in FIG. 11), the front cavity sound outlet hole may make the sound output to the direction of the human ear. The holes shown in the front view (i.e., the sound outlet hole 1310 and the sound outlet hole 1311) may represent the back cavity sound outlet holes. The sound emitted by a sound outlet hole in the front cavity and a sound outlet hole in the back cavity form a directional sound field, thereby achieving the effect of reducing sound leakage.

In some embodiments, a curved structure (not shown in the figure) is disposed at the junction between the side walls of the housing structure shown in the front view and other side walls adjacent to the side wall of the housing structure shown in the front view (for example, the side wall of the housing structure shown in the top view, the side wall of the housing structure shown in the bottom view, the side wall of the housing structure shown in the right view, and the side wall of the housing structure in the left view not shown). For more descriptions of the curved structure, please refer to FIG. 3 and its related descriptions of the present disclosure, which is not be repeated here.

It should be noted that the acoustic output device shown in FIG. 14 is only an example, and in some embodiments, the acoustic output device may not be rectangular, for example, may have the shape of a cylinder, a cone, etc. It should also be noted that, in some embodiments, the above-mentioned front cavity sound outlet holes and back cavity sound outlet holes may be located on non-opposite surfaces, for example, in some embodiments, the front and back cavity sound output holes may be located on adjacent surfaces or on the same surface. In some embodiments, the count of front cavity sound outlet holes and back cavity sound outlet holes may be one, two, or more than two.

In addition, it should be noted that the shapes and positions of the above-mentioned front cavity sound output holes and back cavity sound output holes (and tuning holes) are not limited to those shown in the drawings. For example, in some embodiments, the shape of the above-mentioned front cavity sound output holes, back cavity sound output holes and tuning holes may also be a semicircle, ¼ circle, ellipse, semi-ellipse, polygon, or other irregular shapes.

Figure 15:
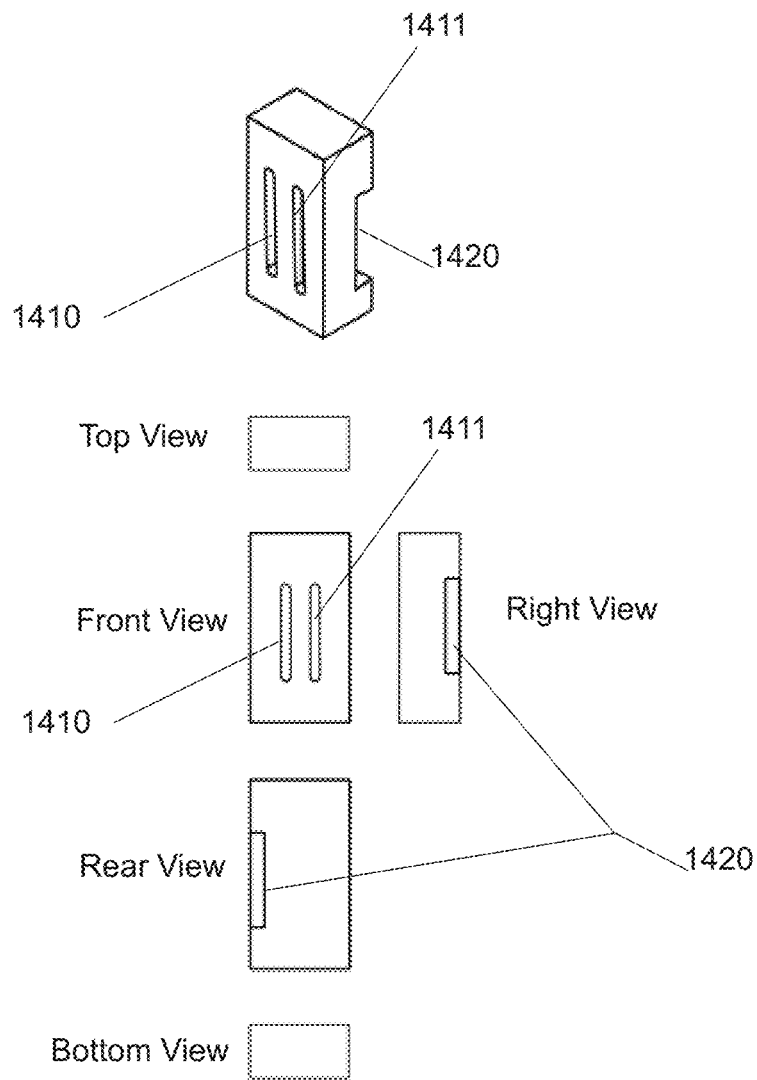
FIG. 15 is an exemplary multi-view illustrating an acoustic output device according to some other embodiments of the present disclosure.

FIG. 15 is an exemplary multi-view illustrating an acoustic output device according to some other embodiments of the present disclosure. As shown in FIG. 15, in some embodiments, the acoustic output device may be in the shape of a cuboid or approximately a cuboid. In some embodiments, the above-mentioned acoustic output device may be applied to head-mounted or ear-hook devices such as glasses. When a user wears a head-mounted or ear-hook devices such as glasses, the acoustic output device is located in front of the user's ear, the surface shown in the rear view faces the user's face (hereinafter referred to as "facing the user"), the surface shown in the front view faces the position in the external environment opposite to the user's face (hereinafter referred to as "facing the outside"), and the surface shown in the right view faces the user's ears. In some embodiments, the acoustic output device may include a sound outlet hole 1410, a sound outlet hole 1411, and a sound outlet hole 1420. The sound outlet hole 1410 and the sound outlet hole 1411 are located on the outer side wall of the housing structure (for example, the second side wall 5102 shown in FIG. 5). The sound outlet hole 1420 is located on an edge of a side wall of the housing structure (e.g., the third side wall 3103 in FIG. 3 or the right side wall shown in FIG. 11) facing the user, and the edge intersects with the side wall of the housing structure facing the user's ear. In some embodiments, the sound outlet hole 1410 and the sound outlet hole 1411 are rectangular, and they are disposed in parallel in the middle area of the side wall of the housing structure facing the outside in the acoustic output device. The sound outlet hole 1420 includes a side facing the user and a side facing the ear, wherein the side facing the user and/or the side facing the ear may also be rectangular. In some embodiments, the sound outlet hole 1420 may be disposed in the middle position or a position close to the user's ear at an edge of the side wall of the housing structure facing the user, and the edge intersects with the side wall of the housing structure facing the user's ear.

In some embodiments, the sound outlet hole 1420 may represent a front cavity sound outlet of the acoustic output device. The sound outlet hole 1420 may make the sound go out toward the direction of the human ear, and form a directional sound field with the sound emitted by the back cavity sound outlet holes (i.e., the sound outlet holes 1410 and 1411) opened in the back cavity on the surface shown in the front view, so as to achieve the effect of reducing sound leakage.

In some embodiments, a curved surface structure (not shown in the figure) is disposed at the junction between the side wall of the housing structure shown in the front view and other side wall adjacent to the side wall of the housing structure shown in the front view (for example, the side wall of the housing structure shown in the top view, the side wall of the housing structure shown in the bottom view, the side wall of the housing structure shown in the right view, and the side wall of the housing structure in the left view not shown). For more descriptions of the curved structure, please refer to FIG. 3 and relevant descriptions thereof in the present disclosure, which will not be repeated here.

For more details about the shapes, numbers, positions, etc., of the sound outlet hole 1410, the sound outlet hole 1411, and the sound outlet hole 1420, please refer to FIG. 14 and the related descriptions, which will not be repeated here.

Figure 16:
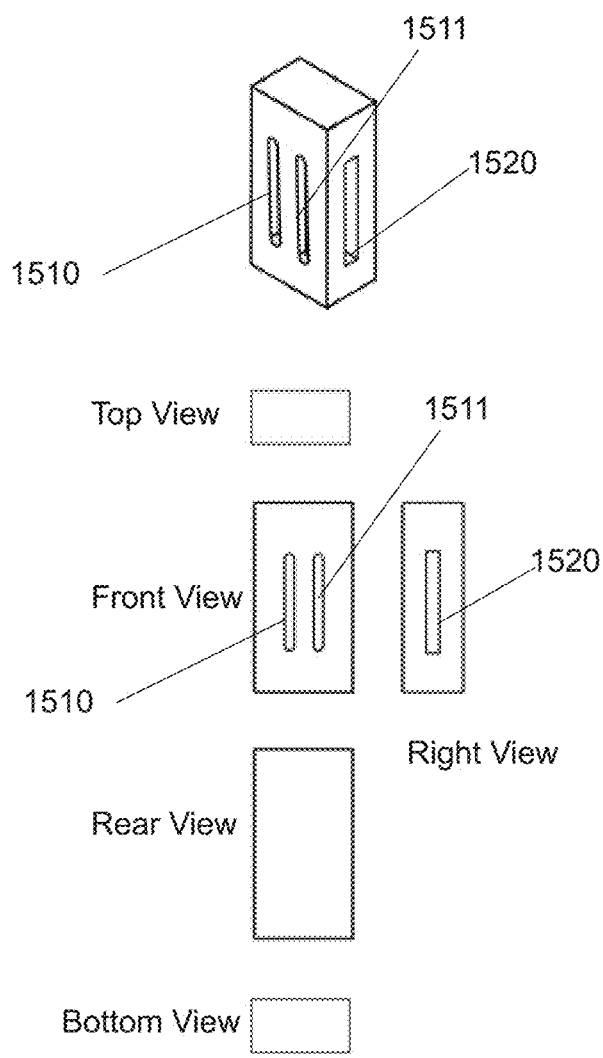
FIG. 16 is an exemplary multi-view illustrating an acoustic output device according to some other embodiments of the present disclosure.

FIG. 16 is an exemplary multi-view illustrating an acoustic output device according to some other embodiments of the present disclosure. As shown in FIG. 16, in some embodiments, the acoustic output device may be in the shape of a cuboid or approximately in the shape of a cuboid. In some embodiments, the above-mentioned acoustic output device may be applied to head-mounted or ear-hook devices such as glasses. When a user wears a head-mounted or ear-hook device such as glasses, the acoustic output device is located in front of the user's ear, the surface shown in the rear view faces the user's face (hereinafter referred to as "facing the user"), the surface shown in the front view faces the position in the external environment opposite to the user's face (hereinafter referred to as "facing the outside"), and the surface shown in the right view faces the user's ears. In some embodiments, the acoustic output device includes a sound outlet hole 1510, a sound outlet hole 1511, and a sound outlet hole 1520. The sound outlet hole 1510 and the sound outlet hole 1511 are located on the outer side wall of the housing structure (for example, the second side wall 5102 shown in FIG. 5), the sound outlet hole 1520 is located on the side wall of the housing structure facing the user's ear (e.g., the side wall of the first cavity 1011 in FIG. 11). In some embodiments, the shapes of the sound outlet hole 1510 and the sound outlet hole 1511 are rectangular, and the two are disposed parallel to each other in the middle area of the side wall of the acoustic output device facing the outside. The sound outlet hole 1520 may also be rectangular, and in some embodiments, the sound outlet hole 1520 may be disposed in the middle area of the side wall of the housing structure facing the user's ear or at a position close to the user's ear. In some embodiments, the sound output hole 1520 may be parallel to the sound output hole 1510 and the sound output hole 1511 described above.

In some embodiments, the above-mentioned sound outlet hole 1520 may represent the front cavity sound outlet of the acoustic output device, the sound outlet hole 1520 may make the sound go out to the human ear, and form a directional sound field with the sound emitted by the back cavity sound outlet opening on the side wall corresponding to the front view of the housing structure (that is, the sound outlet hole 1510 and the sound outlet hole 1511), so as to achieve the effect of reducing leakage.

In some embodiments, a curved surface structure (not shown in the figure) is disposed at the junction between the side wall of the housing structure shown in the front view and other side wall adjacent to the side wall of the housing structure shown in the front view (for example, the side wall of the housing structure shown in the top view, the side wall of the housing structure shown in the bottom view, the side wall of the housing structure shown in the right view, and the side wall of the housing structure in the left view not shown). For more descriptions regarding the curved structure, please refer to FIG. 3 and relevant descriptions thereof in the present disclosure, which will not be repeated here.

For more details on the shapes, numbers, positions, etc., of the sound outlet hole 1510, the sound outlet hole 1511, and the sound outlet hole 1520, please refer to FIG. 14 and the related descriptions, which will not be repeated here.

Figure 17:
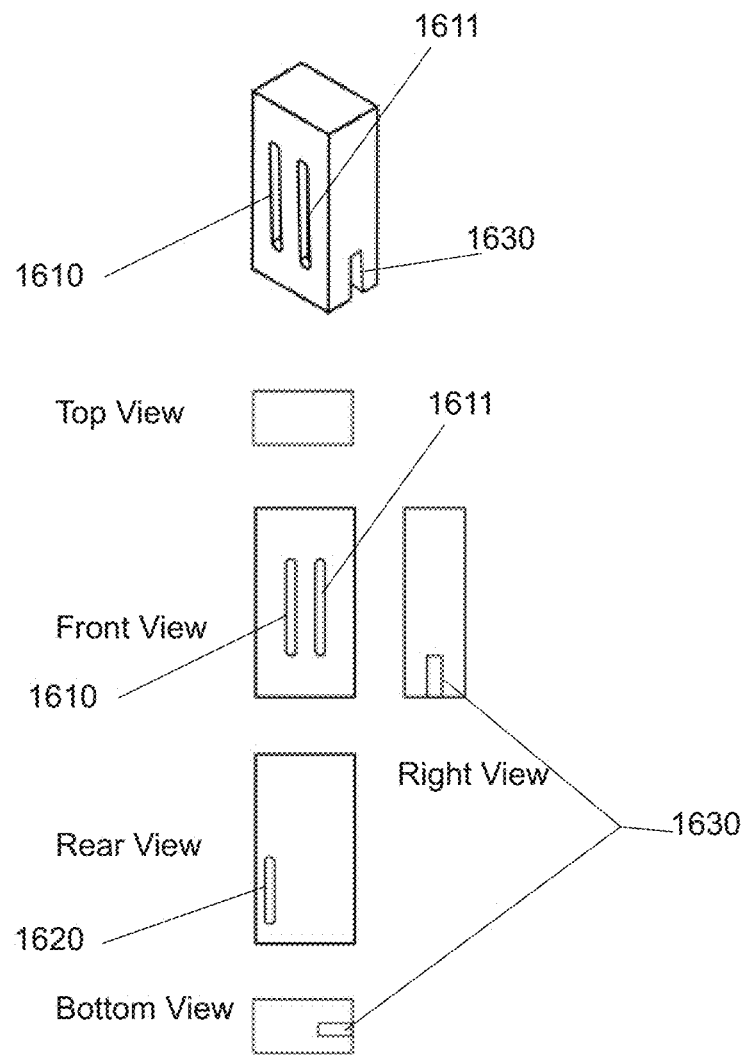
FIG. 17 is an exemplary multi-view illustrating an acoustic output device according to some other embodiments of the present disclosure.

FIG. 17 is an exemplary multi-view illustrating an acoustic output device according to some other embodiments of the present disclosure. As shown in FIG. 17, in some embodiments, the acoustic output device may be in the shape of a cuboid or approximately in the shape of a cuboid. In some embodiments, the above-mentioned acoustic output device may be applied to head-mounted or ear-hook devices such as glasses. When a user wears a head-mounted or ear-hook device such as glasses, the acoustic output device is located in front of the user's ear, the surface shown in the rear view faces the user's face (hereinafter referred to as "facing the user"), the surface shown in the front view faces the position in the external environment opposite to the user's face (hereinafter referred to as "facing the outside"), and the surface shown in the right view faces the user's ears. In some embodiments, the acoustic output device includes a sound outlet hole 1610, a sound outlet hole 1611, a sound outlet hole 1620, and a sound outlet hole 1630. The sound outlet hole 1610 and the sound outlet hole 1611 are located on the outer side wall of the housing structure (for example, the second side wall 5102 shown in FIG. 5), the sound outlet hole 1620 is located on the side wall of the housing structure facing the user (for example, the side wall of the cavity 1011 in FIG. 11), the sound outlet hole 1630 is located on the side wall of the housing structure facing the user's ear and on the side wall corresponding to the bottom view of the housing structure (e.g., the side wall of the first cavity 1011 in FIG. 11). In some embodiments, the shapes of the sound outlet hole 1610 and the sound outlet hole 1611 are rectangular, and the two are disposed parallel to each other in the middle area of the side wall of the acoustic output device facing the outside. The sound outlet hole 1620 may also be rectangular, and in some embodiments, the sound outlet hole 1620 may be disposed in the middle area of the side facing the user or at a position close to the user's ear. The sound outlet hole 1630 may include a first opening on the side of the housing structure facing the user's ear and a second opening on the side close to the user's ear and perpendicular to the human body (i.e., the lower surface of the acoustic output device), wherein both the first opening and the second opening may be rectangular, and the first opening and the second opening may communicate with each other.

In some embodiments, the sound outlet hole 1620 and the sound outlet hole 1630 may represent the front cavity sound outlet holes of the acoustic output device, the sound outlet hole 1620 and the sound outlet hole 1630 may make the sound go out toward the human ear, and form a directional sound field with the sound emitted by the back cavity sound outlet holes (that is, the sound outlet hole 1610 and the sound outlet hole 1611) opened on the side wall corresponding to the front view of the housing structure, so as to achieve the effect of reducing sound leakage.

In some embodiments, a curved structure (not shown in the figure) is disposed at the junction between the side wall of the housing structure shown in the front view and other side wall adjacent to the side wall of the housing structure shown in the front view (for example, the side wall of the housing structure shown in the top view, the side wall of the housing structure shown in the bottom view, the side wall of the housing structure shown in the right view, and the side wall of the housing structure in the left view not shown). For more descriptions regarding the curved structure, please refer to FIG. 3 and relevant descriptions thereof in the present disclosure, which will not be repeated here.

For more details about the shapes, numbers, and positions of the sound outlet hole 1610, the sound outlet hole 1611, the sound outlet hole 1620, and the sound outlet hole 1630, please refer to FIG. 14 and the related descriptions, which will not be repeated here.

Figure 18:
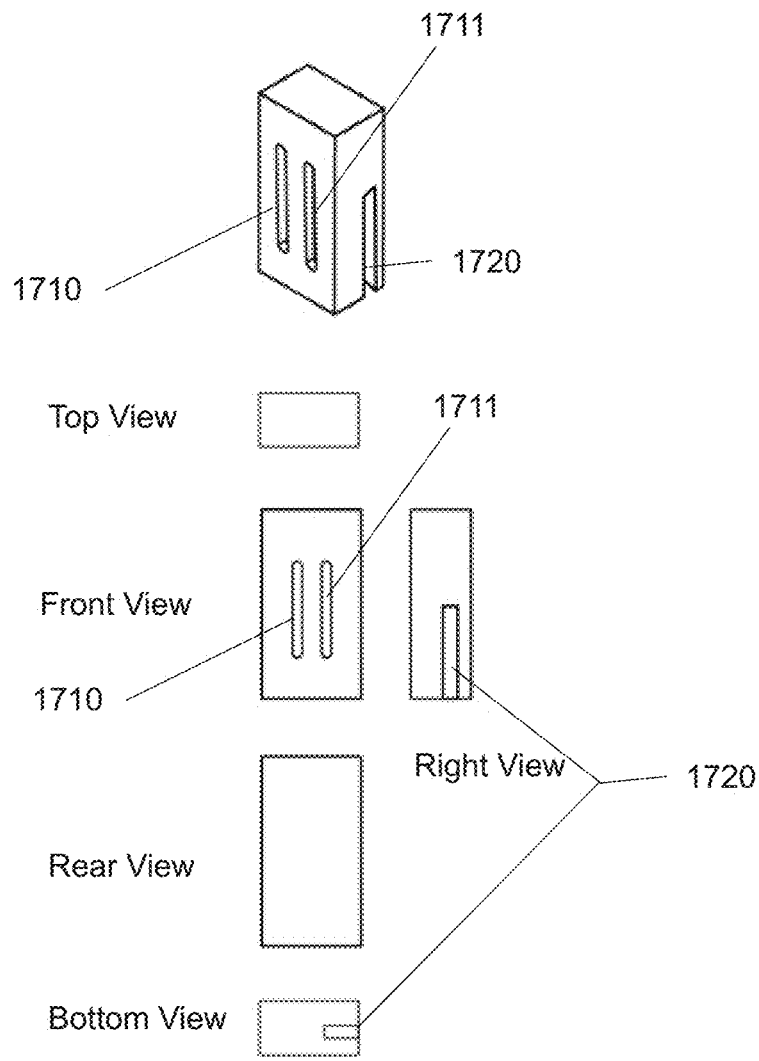
FIG. 18 is an exemplary multi-view illustrating an acoustic output device according to further embodiments of the present disclosure.

FIG. 18 is an exemplary multi-view illustrating an acoustic output device according to some other embodiments of the present disclosure. As shown in FIG. 18, in some embodiments, the acoustic output device may be in the shape of a cuboid or approximately in the shape of a cuboid. In some embodiments, the above-mentioned acoustic output device may be applied to head-mounted or ear-hook devices such as glasses. When a user wears a head-mounted or ear-hook device such as glasses, the acoustic output device is located in front of the user's ear, the surface shown in the rear view faces the user's face (hereinafter referred to as "facing the user"), the surface shown in the front view faces the position in the external environment opposite to the user's face (hereinafter referred to as "facing the outside"), and the surface shown in the right view faces the user's ears. In some embodiments, the acoustic output device includes a sound outlet hole 1710, a sound outlet hole 1711, and a sound outlet hole 1720. The sound outlet hole 1710 and the sound outlet hole 1711 are located on the outer side wall of the housing structure (for example, the second side wall 5102 shown in FIG. 5), the sound outlet hole 1720 is located on the side wall of the housing structure facing the user's ear and the side wall corresponding to the bottom view (e.g., the side wall of the first cavity 1011 in FIG. 11). In some embodiments, the shape of the sound outlet hole 1710 and the sound outlet hole 1711 are rectangular, and the two are disposed in parallel to each other in the middle area of the side wall of the acoustic output device facing the outside. The sound outlet hole 1720 may include a first opening on the side facing the user's ear and a second opening on the side close to the user's ear and perpendicular to the human body (i.e., the lower surface of the acoustic output device), wherein both the first opening and the second opening may be rectangular, and the first opening and the second opening may communicate with each other.

In some embodiments, the above-mentioned sound outlet hole 1720 may represent a front cavity sound outlet hole of the acoustic output device, the sound outlet hole 1720 may transmit sound to the human ear, and form a directional sound field with the sound emitted by the back cavity sound outlet hole (that is, the sound outlet hole 1710 and the sound outlet hole 1711) opening on the side wall corresponding to the front view of the housing structure, thereby achieving the effect of reducing sound leakage.

In some embodiments, a curved structure (not shown in the figure) is disposed at the junction between the side wall of the housing structure shown in the front view and the other side wall adjacent to the side wall of the housing structure shown in the front view (for example, the side wall of the housing structure shown in the top view, the side wall of the housing structure shown in the bottom view, the side wall of the housing structure shown in the right view, and the side wall of the housing structure in the left view not shown). For more descriptions regarding the curved structure, please refer to FIG. 3 and relevant descriptions thereof in the present disclosure, which will not be repeated here.

Figure 19:
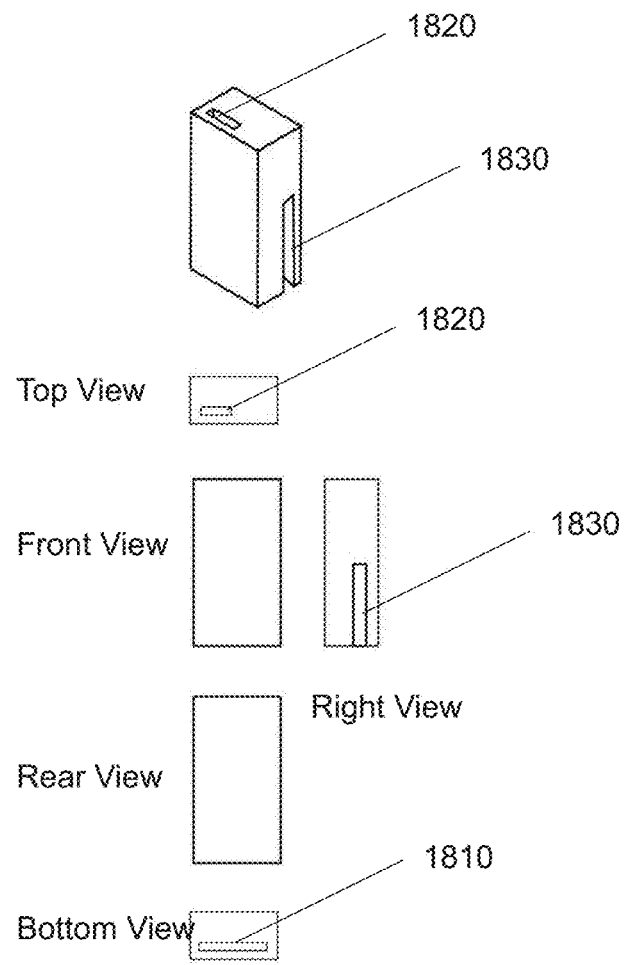
FIG. 19 is an exemplary multi-view illustrating an acoustic output device according to further embodiments of the present disclosure.

FIG. 19 is an exemplary multi-view illustrating an acoustic output device according to some other embodiments of the present disclosure. As shown in FIG. 19, in some embodiments, the acoustic output device may be in the shape of a cuboid or approximately in the shape of a cuboid. In some embodiments, the above-mentioned acoustic output device may be applied to head-mounted or ear-hook devices such as glasses. When a user wears a head-mounted or ear-hook device such as glasses, the acoustic output device is located in front of the user's ear, the surface shown in the rear view faces the user's face (hereinafter referred to as "facing the user"), the surface shown in the front view faces the position in the external environment opposite to the user's face (hereinafter referred to as "facing the outside"), and the surface shown in the right view faces the user's ears. In some embodiments, the acoustic output device may include a sound outlet hole 1810, a sound outlet hole 1820, and a sound outlet hole 1830. The sound outlet hole 1810 is located on one side wall corresponding to the bottom view of the housing structure (for example, the first side wall 5101 in FIG. 5), the sound outlet hole 1820 is located on the side wall corresponding to the top view of the housing structure (e.g., the first side wall 5101 in FIG. 5), and the sound outlet hole 1830 is located on the side wall of the housing structure facing the user's ear. In some embodiments, the shape of the sound outlet hole 1810, the sound outlet hole 1820, and the sound outlet hole 1830 may be rectangular, wherein the area of the sound outlet hole 1810 may be larger than that of the sound outlet hole 1820.

In some embodiments, the above-mentioned sound outlet hole 1830 may represent a front cavity sound outlet hole of the acoustic output device, the sound outlet hole 1830 may make the sound go out towards the human ear, and form a directional sound field with the sound emitted by the sound outlet hole 1810 (the back cavity sound outlet hole) opened on the side wall corresponding to the bottom view of the housing structure, so as to achieve the effect of reducing sound leakage. At the same time, the sound outlet hole 1820 (also called a sound tuning hole) may also be opened on the plane corresponding to the top view, so as to suppress the formation of standing waves.

In some embodiments, a curved structure (not shown in the figure) is disposed at the junction between the side wall of the housing structure shown in the front view and other side wall adjacent to the side wall of the housing structure shown in the front view (for example, the side wall of the housing structure shown in the top view, the side wall of the housing structure shown in the bottom view, the side wall of the housing structure shown in the right view, and the side wall of the housing structure in the left view not shown). For more descriptions regarding the curved structure, please refer to FIG. 3 and relevant descriptions thereof in the present disclosure, which will not be repeated here.

For more details about the shapes, numbers, positions, etc., of the sound outlet hole 1810, the sound outlet hole 1820, and the sound outlet hole 1830, please refer to FIG. 14 and the related descriptions, which will not be repeated here.

Figure 20:
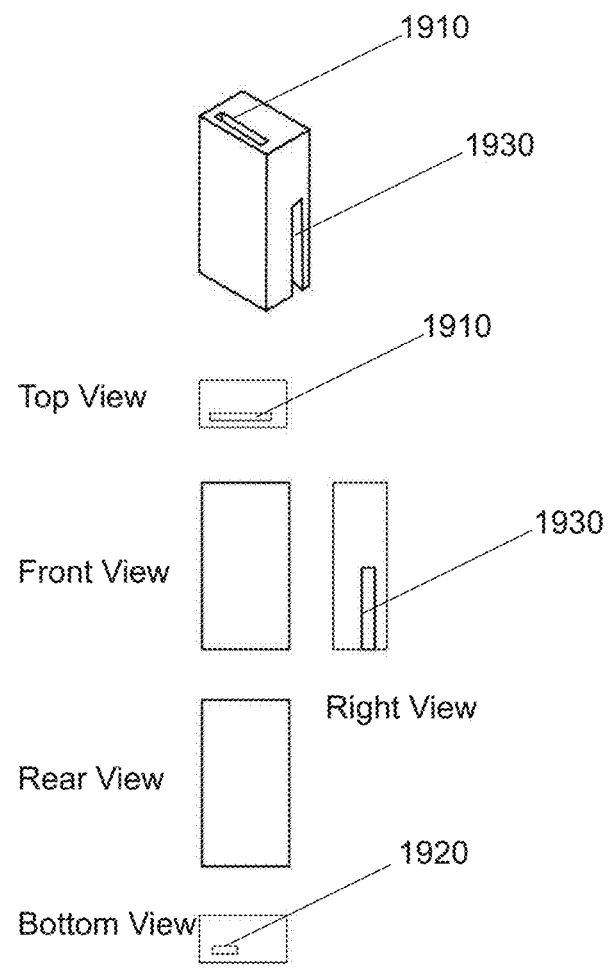
FIG. 20 is an exemplary multi-view illustrating an acoustic output device according to further embodiments of the present disclosure.

FIG. 20 is an exemplary multi-view illustrating an acoustic output device according to some other embodiments of the present disclosure. As shown in FIG. 20, in some embodiments, the acoustic output device may be in the shape of a cuboid or approximately a cuboid. In some embodiments, the above-mentioned acoustic output device may be applied to head-mounted or ear-hook devices such as glasses. When a user wears a head-mounted or ear-hook device such as glasses, the acoustic output device is located in front of the user's ear, the surface shown in the rear view faces the user's face (hereinafter referred to as "facing the user"), the surface shown in the front view faces the position in the external environment opposite to the user's face (hereinafter referred to as "facing the outside"), and the surface shown in the right view faces the user's ears. In some embodiments, the acoustic output device includes a sound outlet hole 1910, a sound outlet hole 1920, and a sound outlet hole 1930. The sound outlet hole 1910 is located on one side wall corresponding to the top view of the housing structure (for example, the first side wall 5101 in FIG. 5), the sound outlet hole 1920 is located on the side wall corresponding to the bottom view of the housing structure (e.g., the first side wall 5101 in FIG. 5), and the sound outlet hole 1930 is located on the side wall of the housing structure facing the user's ear. In some embodiments, the sound outlet hole 1910, the sound outlet hole 1920, and the sound outlet hole 1930 may be rectangular in shape, wherein the area of the sound outlet hole 1910 may be larger than that of the sound outlet hole 1920.

In some embodiments, the sound outlet hole 1930 may represent a front cavity sound outlet hole of the acoustic output device, the sound outlet hole 1930 may make the sound go out towards the human ear, and form a directional sound field with the sound emitted by the sound outlet hole 1910 (the back cavity sound outlet hole) opened on the side wall corresponding to the top view of the housing structure, so as to achieve the effect of reducing sound leakage. At the same time, the sound outlet hole 1920 (also called a tuning hole) may also be opened in the plane corresponding to the bottom view, so as to suppress the formation of standing waves.

In some embodiments, a curved structure (not shown in the figure) is disposed at the junction between the side wall of the housing structure shown in the front view and other side wall adjacent to the side wall of the housing structure shown in the front view (for example, the side wall of the housing structure shown in the top view, the side wall of the housing structure shown in the bottom view, the side wall of the housing structure shown in the right view, and the side wall of the housing structure in the left view not shown). For the more descriptions regarding the curved structure, please refer to FIG. 3 and relevant descriptions thereof in the present disclosure, which will not be repeated here.

For more details about the shapes, numbers, positions, etc., of the sound outlet hole 1910, the sound outlet hole 1920, and the sound outlet hole 1930, please refer to FIG. 14 and the related descriptions, which will not be repeated here.

Figure 21:
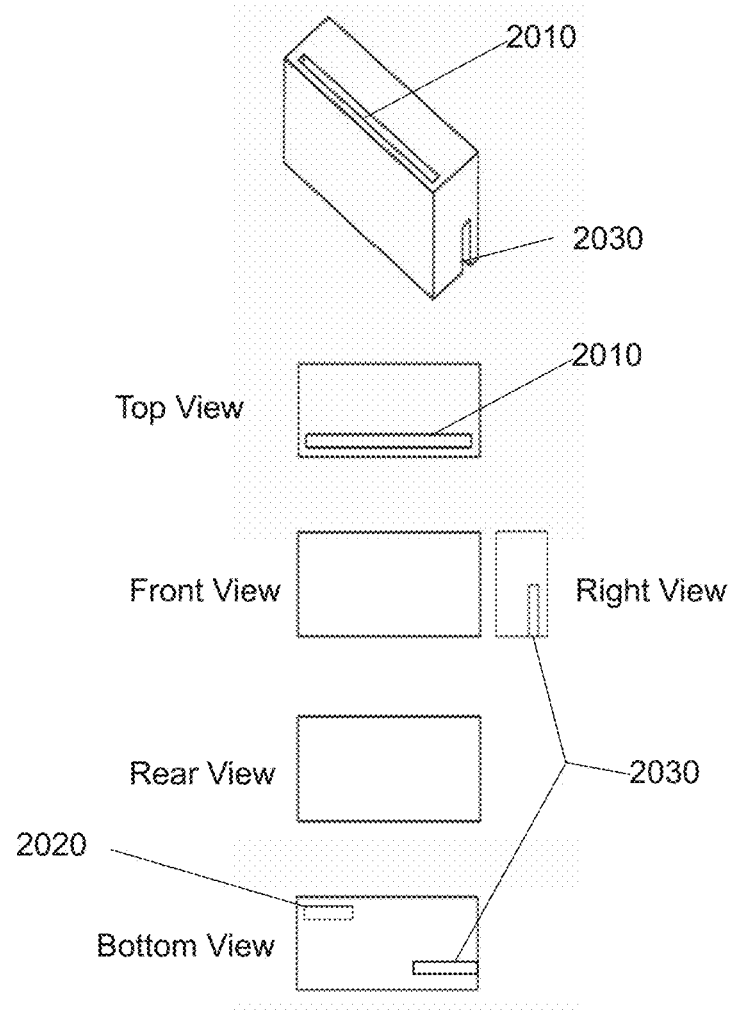
FIG. 21 is an exemplary multi-view illustrating an acoustic output device according to further embodiments of the present disclosure.

FIG. 21 is an exemplary multi-view illustrating an acoustic output device according to some other embodiments of the present disclosure. As shown in FIG. 21, in some embodiments, the acoustic output device may be in the shape of a cuboid or approximately in the shape of a cuboid. In some embodiments, the above-described acoustic output device may be applied to an open-back earphone device (e.g., a wired earphone, a wireless earphone). When a user wears the open-back earphone device, the acoustic output device is located in the user's auricle, and the surface shown in the rear view faces the user's face (hereinafter referred to as "facing the user"), the surface shown in the top view faces the position in the external environment opposite to the user's face (hereinafter referred to as "facing the outside"), and the surface shown in the bottom view faces the user's ear. In some embodiments, the acoustic output device includes a sound outlet hole 2010, a sound outlet hole 2020, and a sound outlet hole 2030. The sound outlet hole 2010 is located on the side wall corresponding to the top view of the housing structure (for example, the side wall of the first cavity 1011 shown in FIG. 11), the sound outlet hole 2020 is located on the side wall corresponding to the bottom view of the housing structure (for example, the second side wall 5102 shown in FIG. 5), the sound outlet hole 2030 is located on the side wall of the housing structure facing the user's ear canal and the side wall corresponding to the bottom view of the housing structure (for example, the side wall of the first cavity 1011 shown in FIG. 11). In some embodiments, the shapes of the sound outlet hole 2010 and the sound outlet hole 2020 may be rectangular, wherein the area of the sound outlet hole 2010 may be larger than the area of the sound outlet hole 2020. The sound outlet hole 2030 may include a first opening facing the user's ear and a second opening located on a plane corresponding to the bottom view. The first opening and the second opening may be rectangular, and the first opening and the second opening may communicate with each other.

In some embodiments, the above-mentioned sound outlet hole 2030 may represent a front cavity sound outlet hole of the acoustic output device, the sound outlet hole 2030 may make the sound go out towards the human ear, and form a directional sound field with the sound emitted by the sound outlet hole 2010 (the back cavity sound outlet hole) opened on the side wall corresponding to the top view of the housing structure, so as to achieve the effect of reducing sound leakage. The center line connecting the sound outlet hole (the sound outlet hole 2030) of the front cavity and the sound outlet hole of the back cavity (the sound outlet hole 2010) is approximately parallel to the user contact surface (the side wall of the housing structure shown in the rear view of FIG. 21). In some embodiments, the "approximately parallel" here means that the included angle between the user contact surface and the center line connecting the sound outlet hole of the front cavity and the sound outlet hole of the back cavity is within a specific range. In some embodiments, the specified range may be no greater than 45 degrees, or no greater than 30 degrees, or no greater than 15 degrees.

In addition, the sound outlet hole 2020 (a tuning hole) may also be opened on the side wall corresponding to the bottom view of the housing structure, so as to cooperate with the sound outlet hole 2010 (the back cavity sound outlet hole) to effectively suppress the formation of standing waves.

It should be noted that the acoustic output device provided in the above embodiments is only an exemplary illustration, and in some embodiments, the acoustic output device may not be rectangular, for example, may have the shape of a cylinder, a cone, etc. It should also be noted that, in some embodiments, a sound outlet hole of the front cavity and a sound outlet hole of the back cavity may be located on surfaces that are not opposite to each other. For example, in some embodiments, the front and back cavity sound outlet holes may be located on adjacent surfaces or on the same surface.

In addition, it should be noted that the shapes and positions of the above-mentioned front cavity sound outlet holes, the back cavity sound outlet holes, and the tuning holes are not limited to those shown in the drawings. For example, in some embodiments, the shapes of a front cavity sound outlet hole, a back cavity sound outlet hole, and a tuning hole may also be a semicircle, ¼ circle, ellipse, semi-ellipse, polygon, or other irregular shapes.

The basic concept has been described above. Obviously, for those skilled in the art, the above detailed disclosure is only an example, and does not constitute a limitation to the present disclosure. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Thus, it should be emphasized and noted that two or more references to "an embodiment" or "one embodiment" or "an alternative embodiment" in various places throughout this present disclosure are not necessarily referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Accordingly, all aspects of the present disclosure may be performed entirely by hardware, may be performed entirely by software (including firmware, resident software, microcode, etc.), or may be performed by a combination of hardware and software. The above hardware or software can be referred to as "data block", "module", "engine", "unit", "component" or "system". In addition, aspects of the present disclosure may appear as a computer product located in one or more computer-readable media, the product including computer-readable program code.

Computer storage media may contain a transmitted data signal containing a computer program code, for example on baseband or as part of a carrier wave. The propagation signal may have a variety of expressions, including electromagnetic form, optical form, etc., or suitable combinations. The computer storage medium may be any computer-readable medium other than the computer-readable storage medium, and the medium may be connected to an instruction to execute a device, device, or device to communicate, spread, or transmit a program for use. Program encoding on a computer storage medium may be propagated by any suitable medium, including radio, cable, fiber optic cable, RF, or a similar medium, or a combination of the above media.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python, or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

In addition, unless clearly stated in the claims, the order of processing elements and sequences, the use of numbers and letters, or the use of other names in the present disclosure are not used to limit the order of the procedures and methods of the present disclosure. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially". Unless otherwise stated, "about," "approximate," or "substantially" may indicate ±20% variation of the value it describes. Accordingly, in some embodiments, the numerical parameters used in the specification and claims are approximate values, and the approximation may change according to the characteristics required by the individual embodiments. In some embodiments, the numerical parameter should consider the prescribed effective digits and adopt a general digit retention method. Although in some embodiments, the numerical fields and parameters used to confirm the breadth of its range are approximate values, in specific embodiments, such numerical values are set as accurately as possible within the feasible range.

Each patent, patent application, patent application publication, and other materials cited herein, such as articles, books, instructions, publications, documents, etc., are hereby incorporated by reference in their entirety. The application history documents that are inconsistent or conflicting with the content of the present disclosure are excluded, and documents that restrict the broadest scope of the claims of the present disclosure (currently or later attached to the present disclosure) are also excluded. It should be noted that if there is any inconsistency or conflict between the description, definition, and/or terminology in the accompanying materials of the present disclosure and the content described in the present disclosure, the description, definition, and/or terminology in the present disclosure shall prevail.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. An acoustic output device, comprising
   an acoustic driver, wherein the acoustic driver includes a diaphragm and a magnetic circuit structure, a side of the diaphragm facing away from the magnetic circuit structure forms a front side of the acoustic driver, a side of the magnetic circuit structure facing away from the diaphragm forms a back side of the acoustic driver, the diaphragm vibrates so that the acoustic driver radiates sounds outward from its front side and back side, respectively; and
   a housing structure configured to carry the acoustic driver, wherein the back side of the acoustic driver and the housing structure form a back cavity, and side walls of the back cavity are connected to each other by a curved structure;
   the housing structure includes at least one sound outlet hole, the at least one sound outlet hole is acoustically coupled with the back cavity and outputs the sound radiated to the back cavity by the acoustic driver to the outside of the acoustic output device, wherein the at least one sound outlet hole is located on at least part of the side walls of the back cavity.

2. The acoustic output device of claim 1, wherein:
   the side walls of the back cavity comprise at least one first side wall and a second side wall,
   the at least one first side wall is located on a peripheral side of the housing structure,
   the second side wall is disposed opposite to the back side of the acoustic driver, and
   one end of the at least one first side wall away from the acoustic driver is connected to an end of the second side wall through the curved structure.

3. The acoustic output device of claim 2, wherein the at least one sound outlet hole is located on the at least one first side wall.

4. The acoustic output device of claim 2, wherein:
   the at least one sound outlet hole comprises a first sound outlet hole and a second sound outlet hole,
   the first sound outlet hole and the second sound outlet hole are located on the at least one first side wall, and
   the first sound outlet hole and the second sound outlet hole are disposed opposite to each other.

5. The acoustic output device of claim 4, wherein a cross-sectional area of the second sound outlet hole is not greater than a cross-sectional area of the first sound outlet hole.

6. The acoustic output device of claim 1, wherein a cross-sectional area of the at least one sound outlet hole is not less than 0.25 mm$^2$.

7. The acoustic output device of claim 1, wherein an acoustic damping structure is provided at the at least one sound outlet hole.

8. The acoustic output device of claim 1, wherein:
   the magnetic circuit structure comprises a magnetic conductive plate disposed opposite to the diaphragm,
   the magnetic conductive plate includes at least one third sound outlet hole, and
   the at least one third sound outlet hole guides a sound generated by vibration of the diaphragm from the back side of the acoustic driver.

9. The acoustic output device of claim 8, wherein a sound guide tube is disposed at the at least one third sound outlet hole along a direction away from the diaphragm, the sound guide tube guides the sound radiated from the at least one third sound outlet hole into the back cavity.

10. The acoustic output device of claim 8, wherein:
    the at least one third sound outlet hole comprises a first hole portion and a second hole portion sequentially disposed from inside to outside,
    the first hole portion and the second hole portion are connected to each other, and
    a diameter of the second hole portion is larger than a diameter of the first hole portion.

11. The acoustic output device of claim 10, wherein a shape of the diaphragm is a plane or approximately a plane.

12. The acoustic output device of claim 11, wherein the diaphragm is fixed on the acoustic driver by a ring, and the ring is sunken in a direction away from the back cavity.

13. The acoustic output device of claim 1, wherein the front side of the acoustic driver is further disposed with a protective structure, and the protective structure is disposed opposite to the diaphragm.

14. The acoustic output device according to claim 13, wherein the protective structure is configured to separate the diaphragm from the outside and transmit the sound emitted by the diaphragm to the outside.

15. The acoustic output device of claim 14, wherein the protective structure comprises a filter structure.

16. The acoustic output device of claim 14, wherein the protective structure comprises a plate body structure with at least one sound outlet hole.

17. The acoustic output device of claim 1, wherein:
    the front side of the acoustic driver and the housing structure form a front cavity,
    the housing structure includes at least one fourth sound guide hole, and
    the fourth sound guide hole guides the sound generated by the diaphragm from the front side of the acoustic driver to the outside of the acoustic output device.

18. The acoustic output device of claim 17, wherein a sound damping structure is provided at the at least one fourth sound outlet hole.

* * * * *